July 14, 1953    H. KOTT    2,644,944
MEANS FOR STRAPPING BOXES
Filed July 9, 1948    13 Sheets-Sheet 1
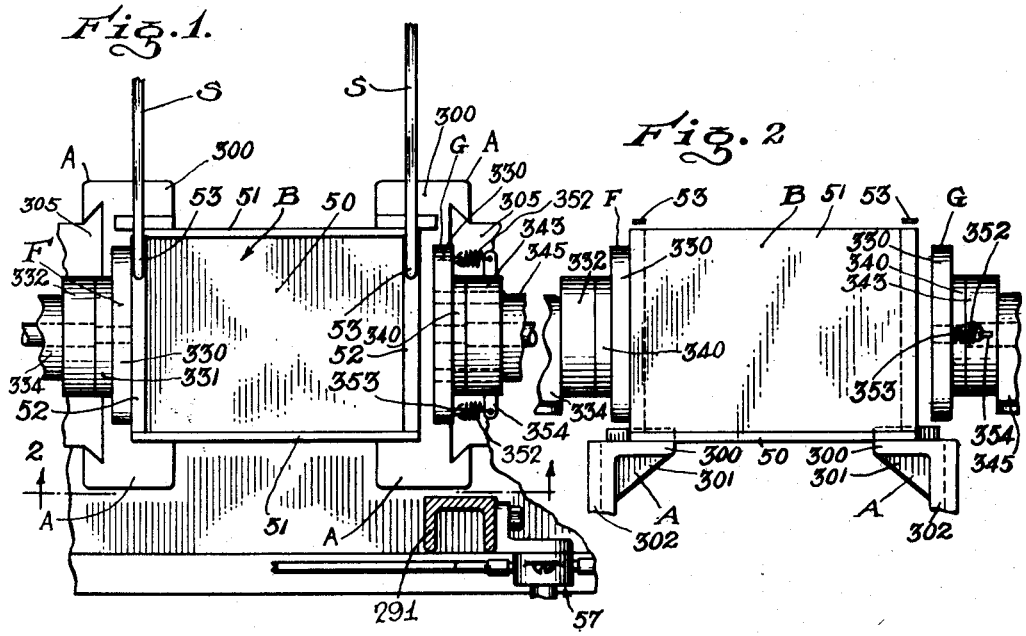
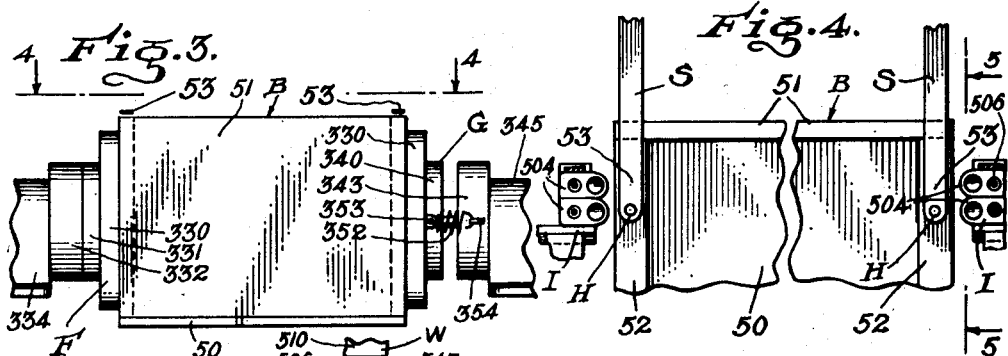
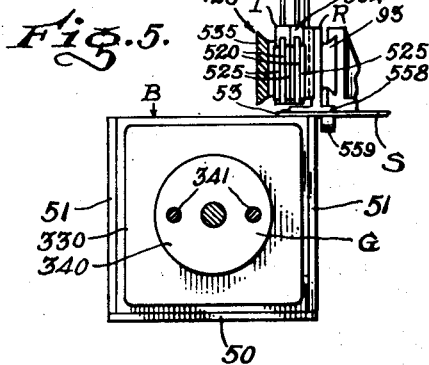
Inventor
Herbert Kott
By
Attorney

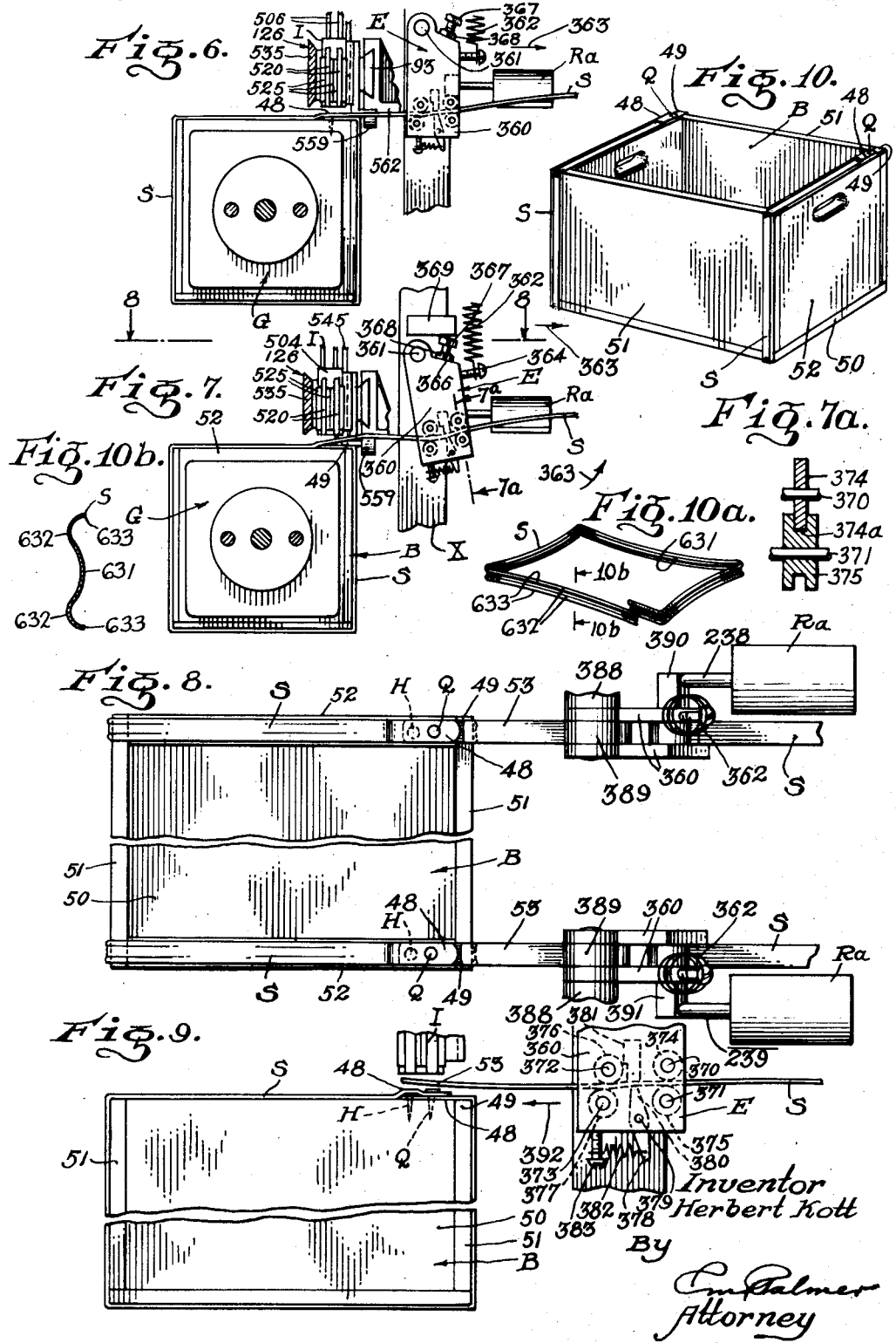

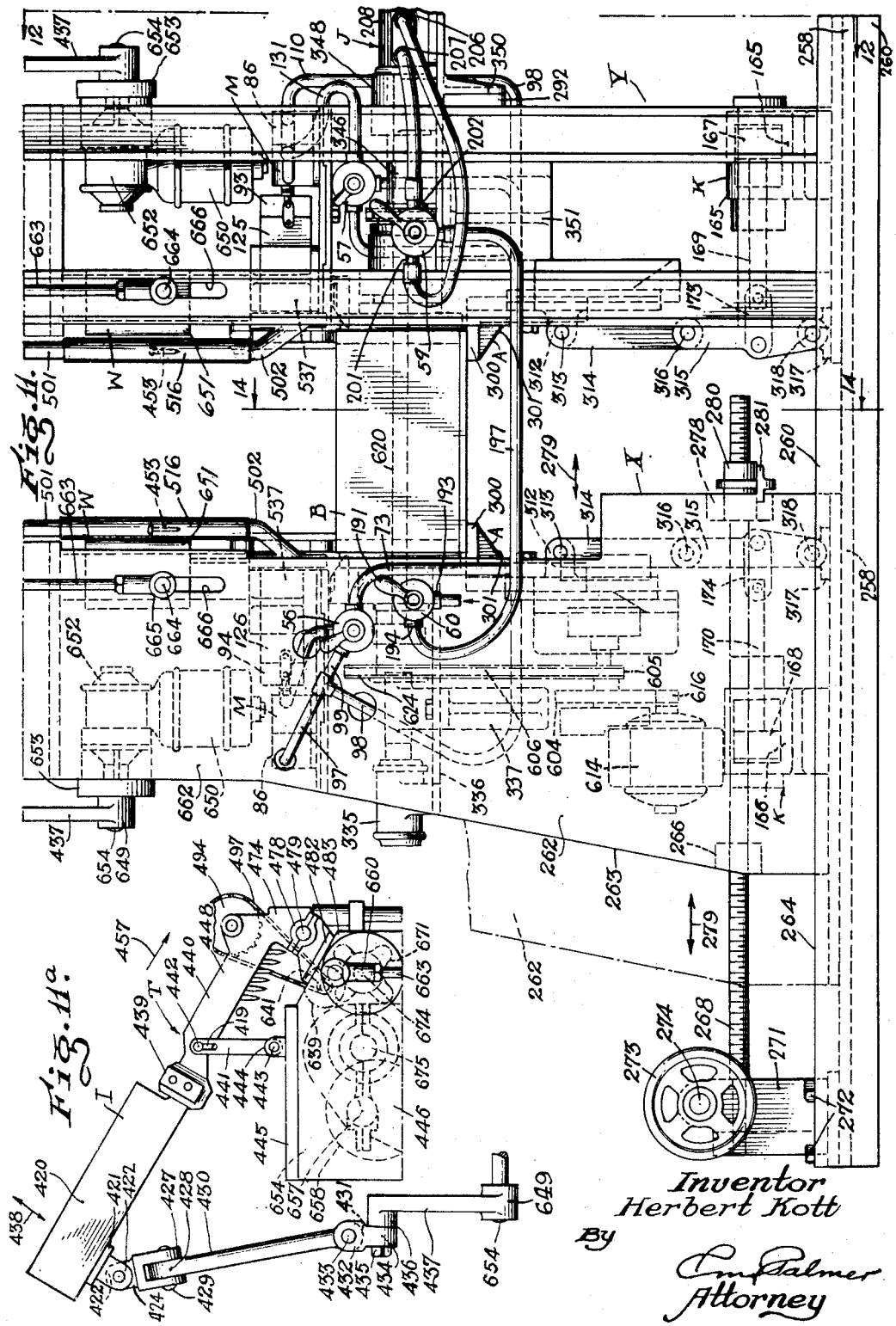

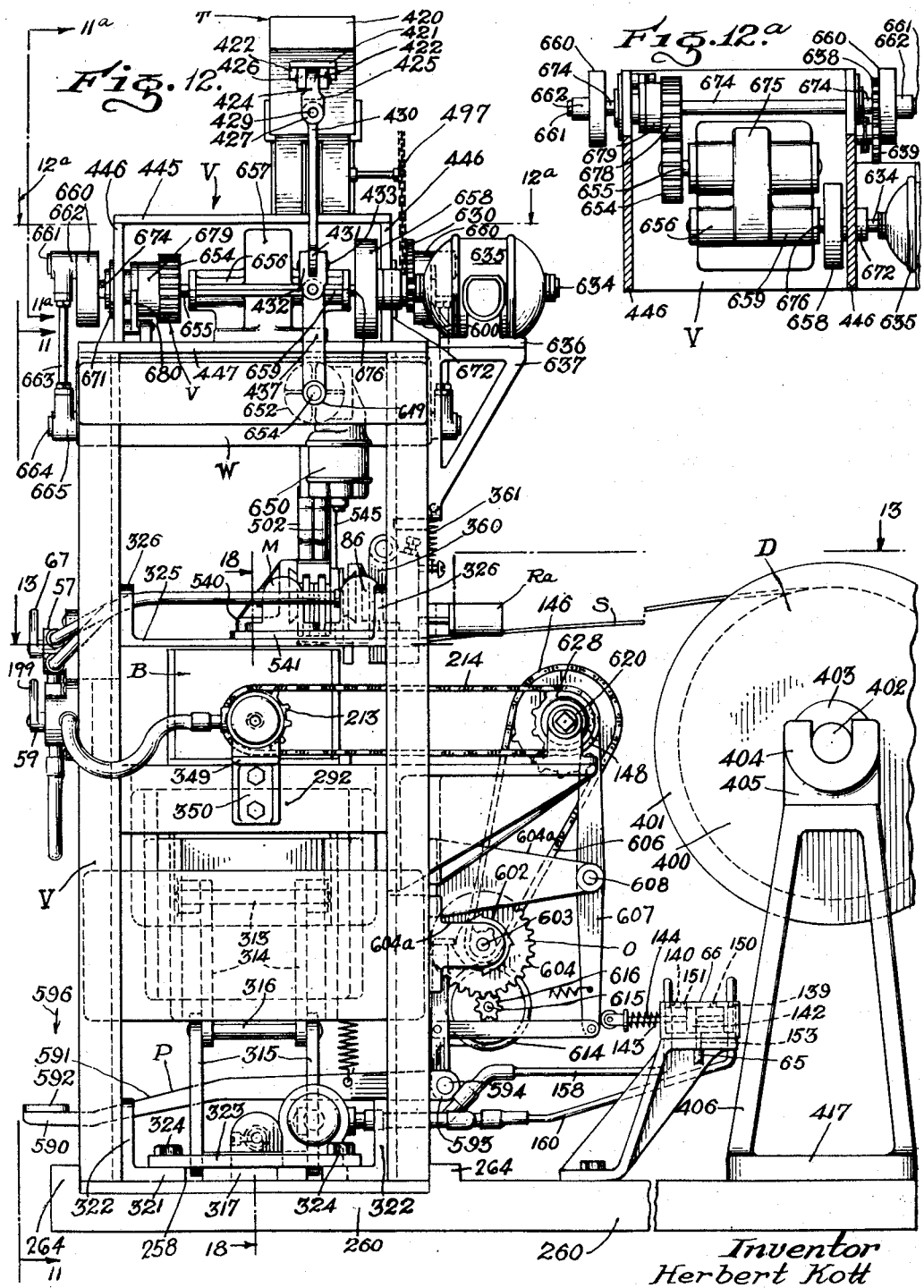

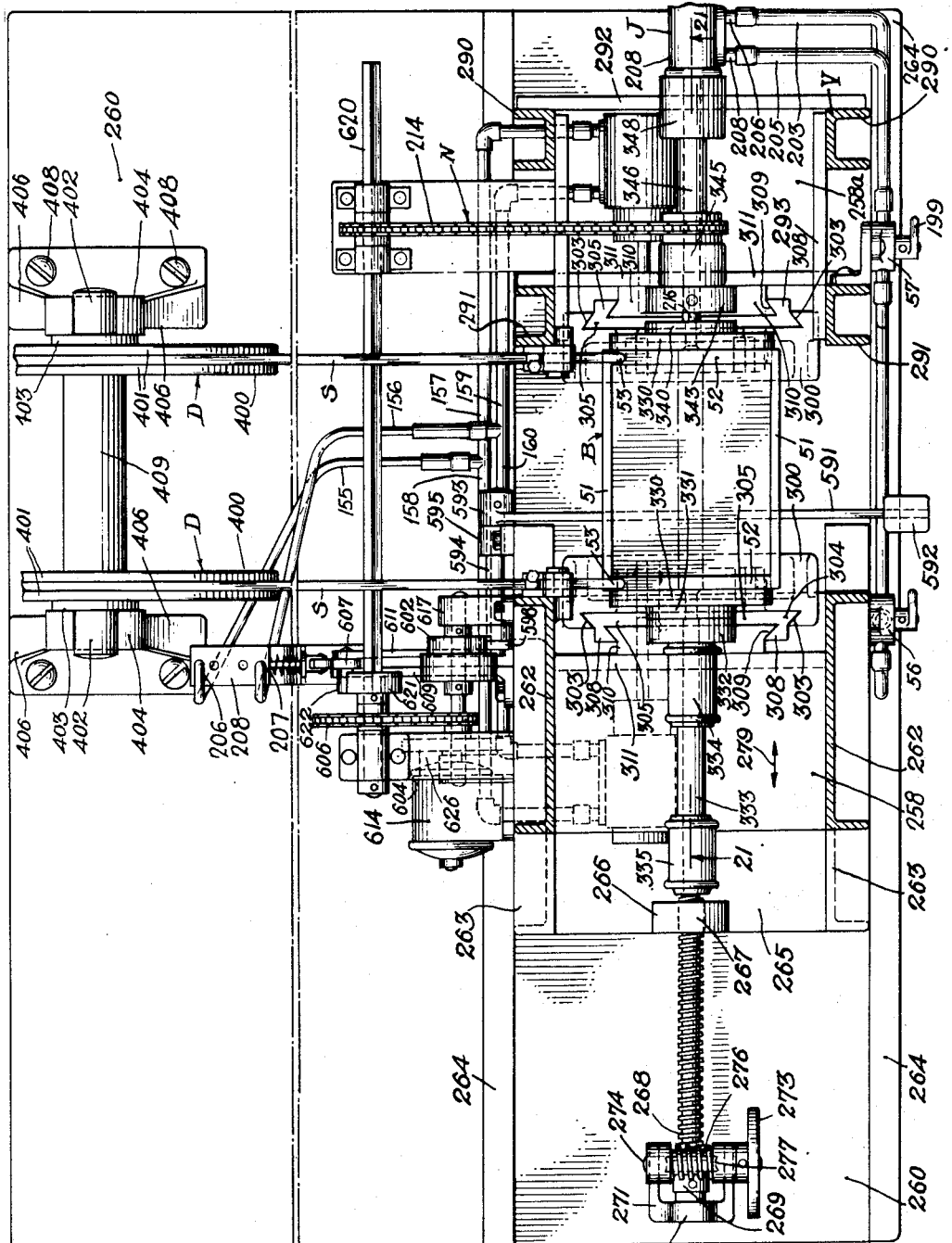

July 14, 1953 H. KOTT 2,644,944
MEANS FOR STRAPPING BOXES
Filed July 9, 1948 13 Sheets-Sheet 6
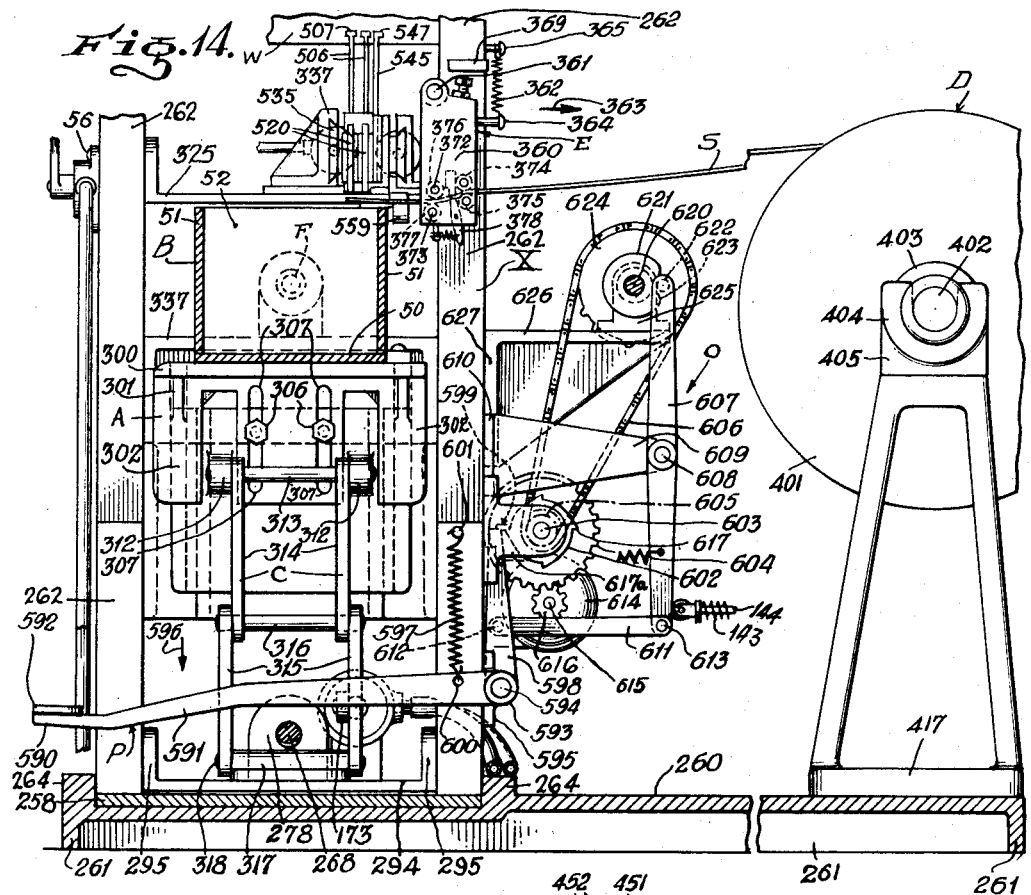
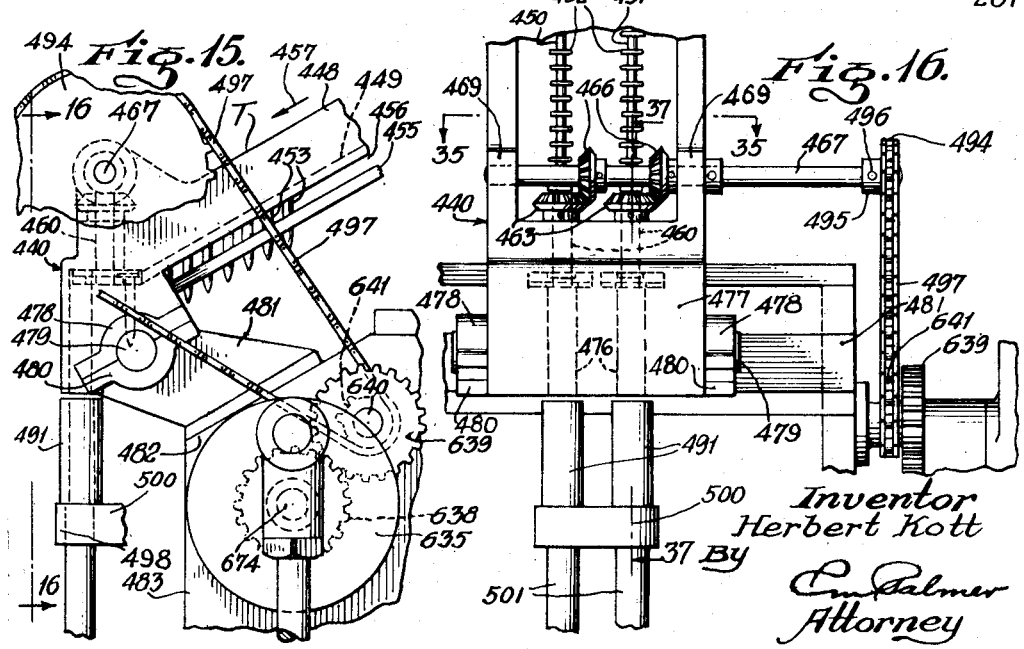
Inventor
Herbert Kott
By
Palmer
Attorney July 14, 1953
H. KOTT
2,644,944
MEANS FOR STRAPPING BOXES
Filed July 9, 1948
13 Sheets-Sheet 7
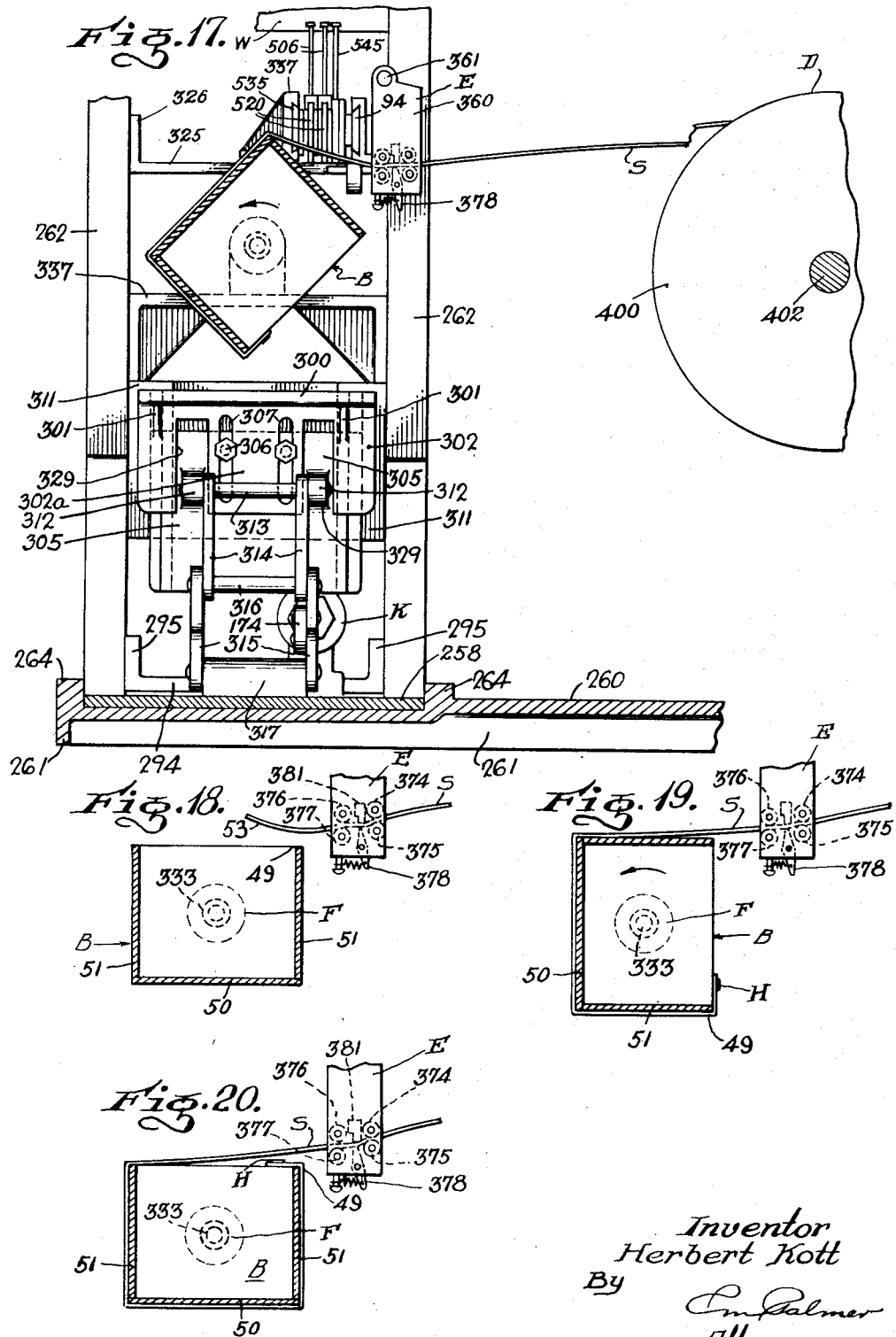
Inventor
Herbert Kott
By
Em Palmer
Attorney July 14, 1953 H. KOTT 2,644,944
MEANS FOR STRAPPING BOXES
Filed July 9, 1948 13 Sheets-Sheet 8
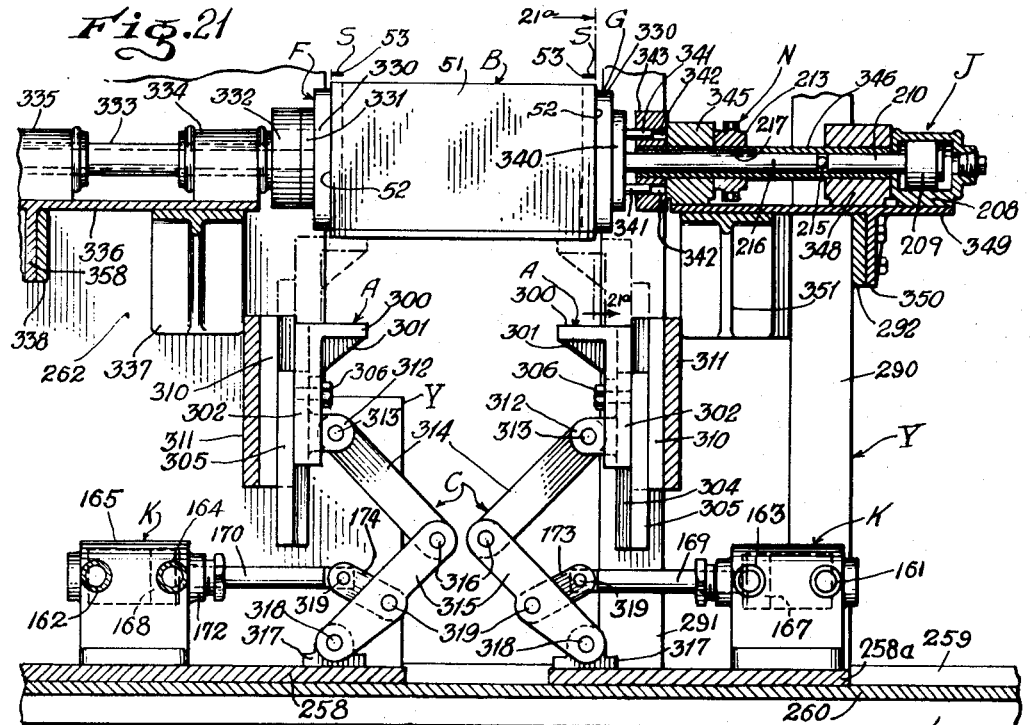
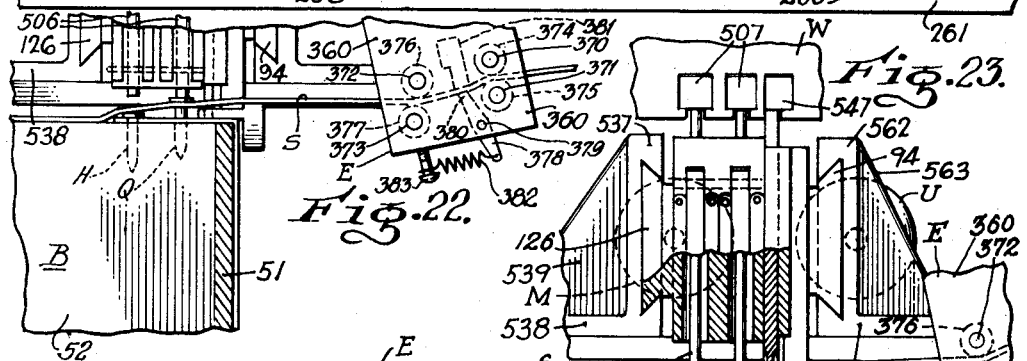
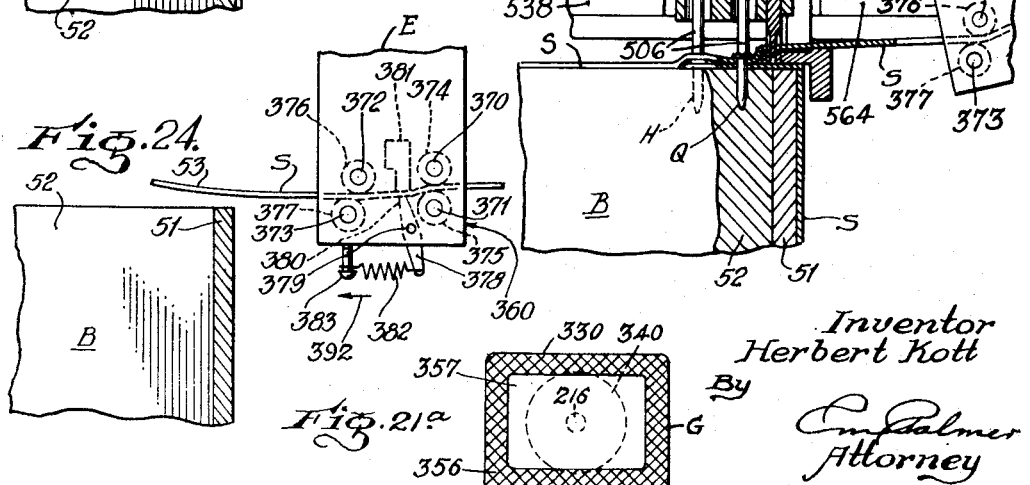
Inventor
Herbert Kott
By
Attorney

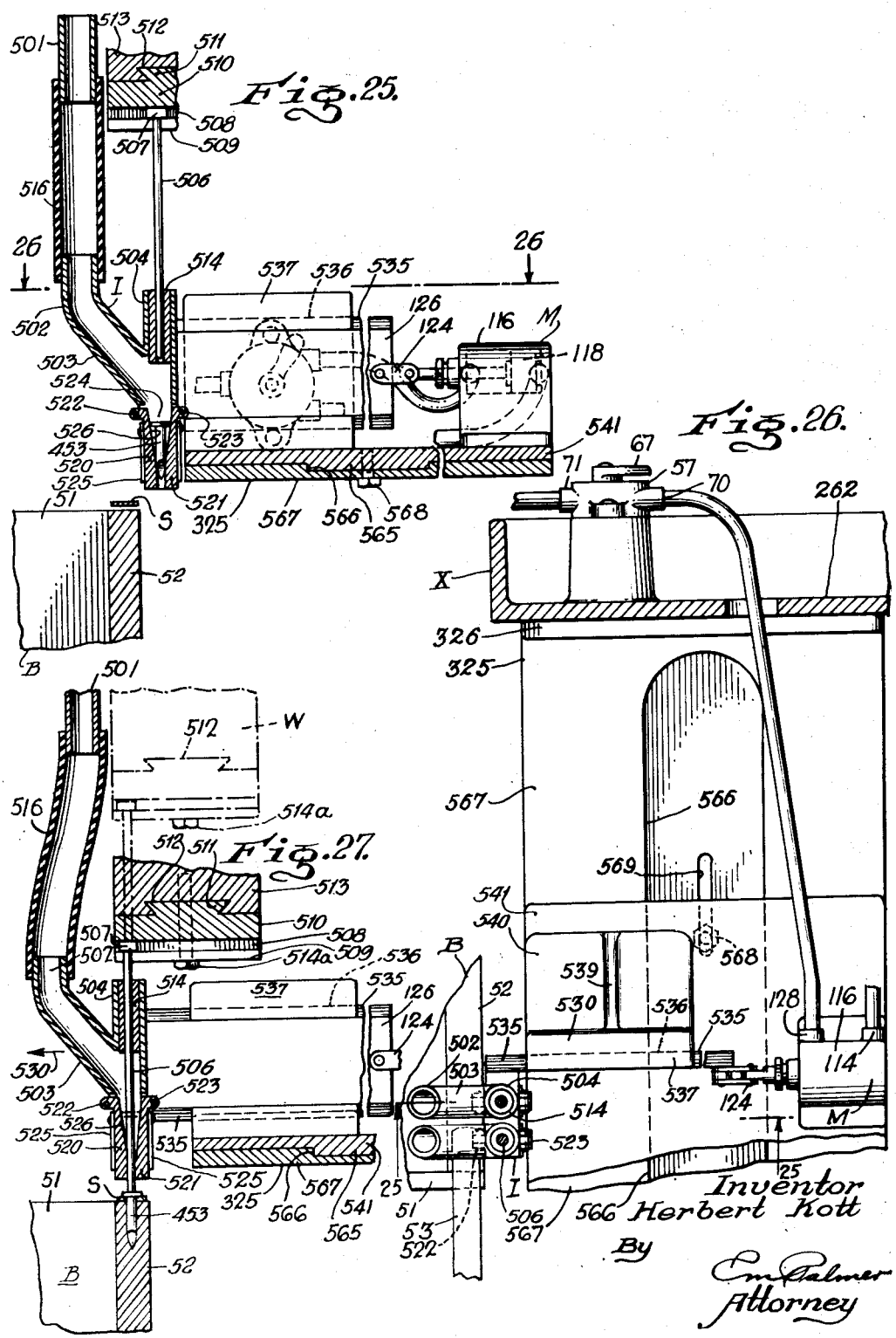

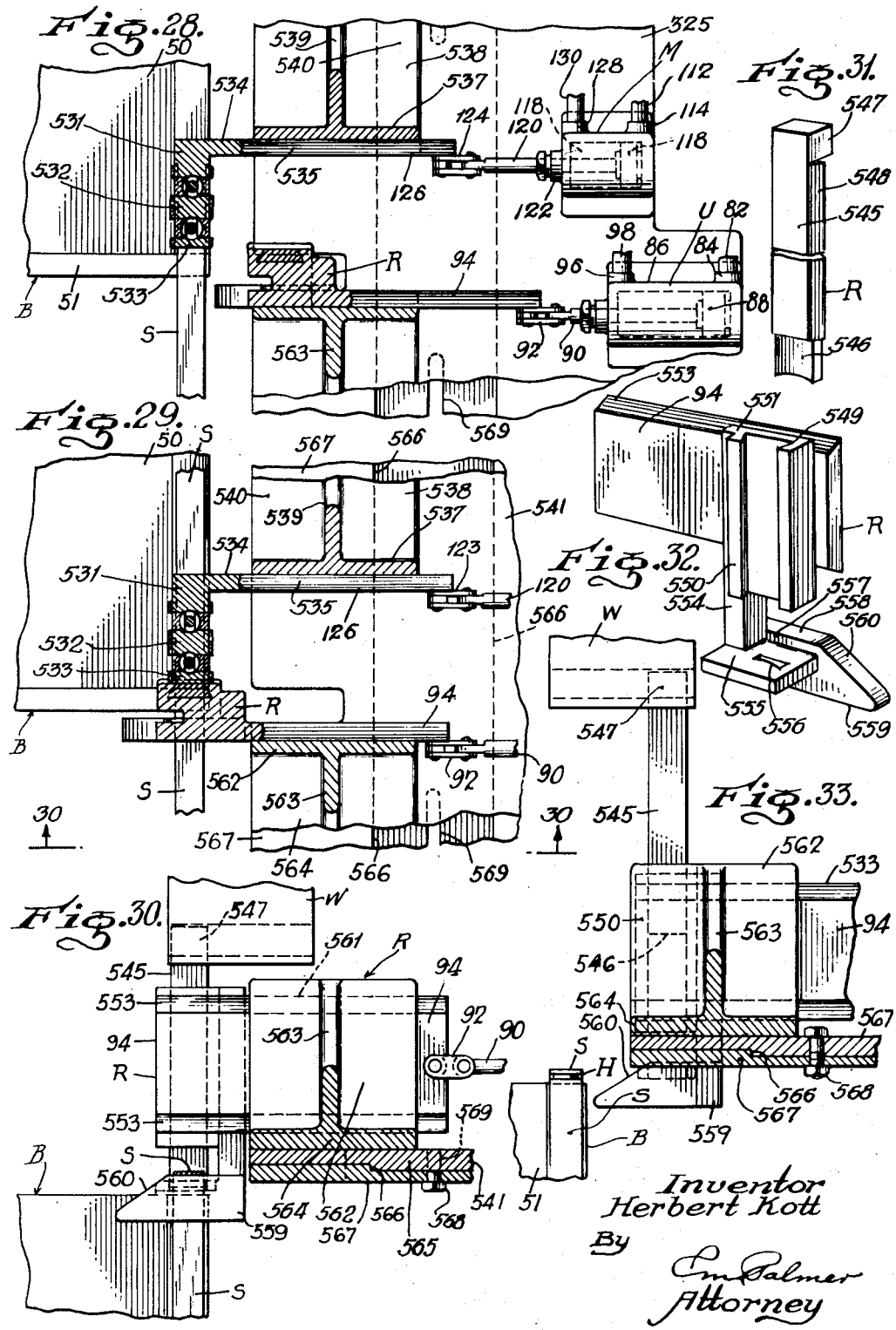

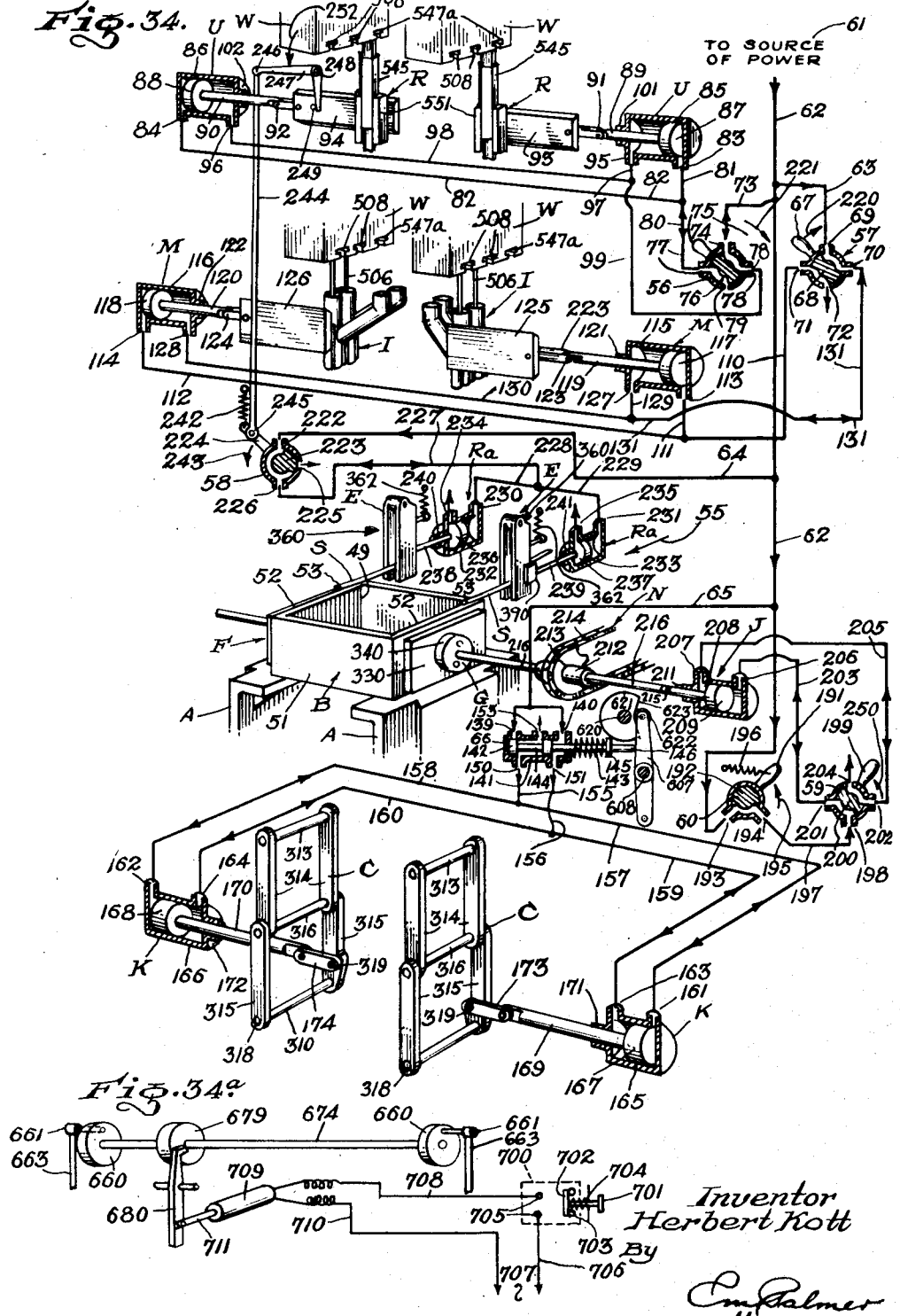

July 14, 1953 H. KOTT 2,644,944
MEANS FOR STRAPPING BOXES
Filed July 9, 1948 13 Sheets-Sheet 12
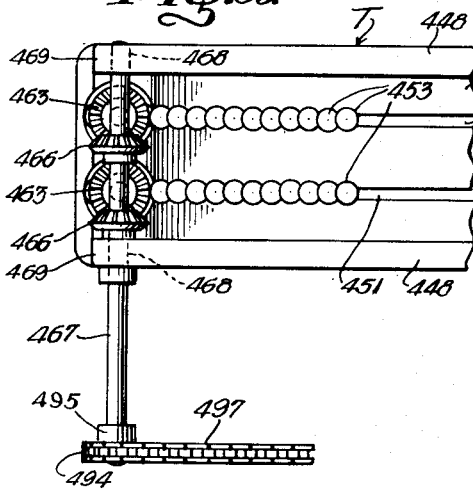
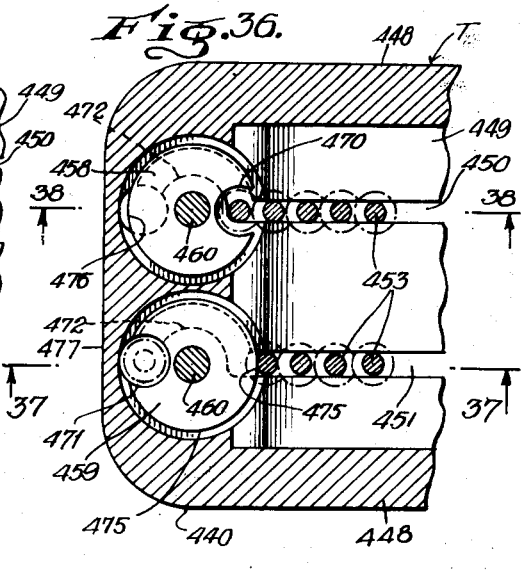
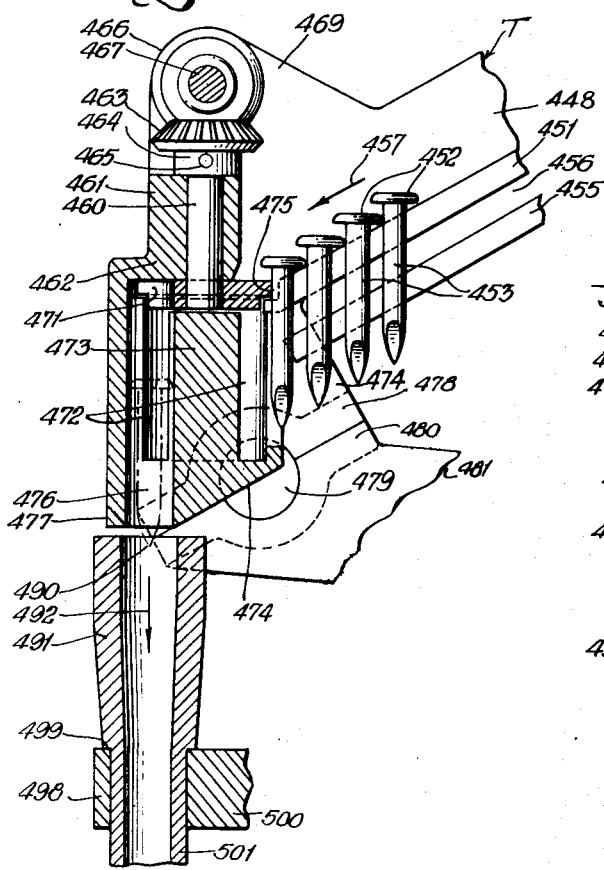
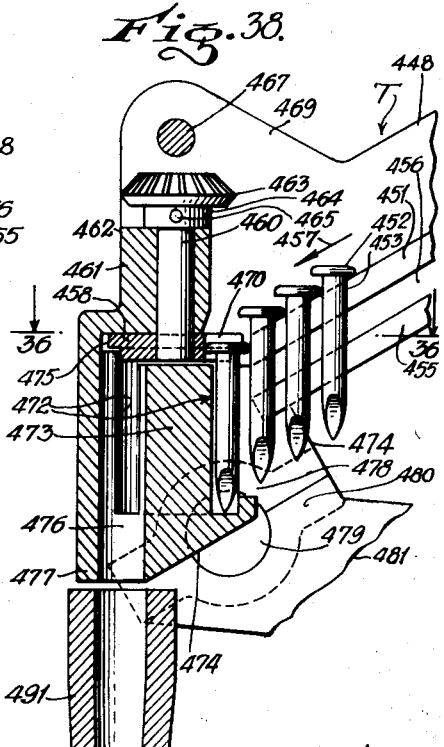
Inventor
Herbert Kott
By
Attorney

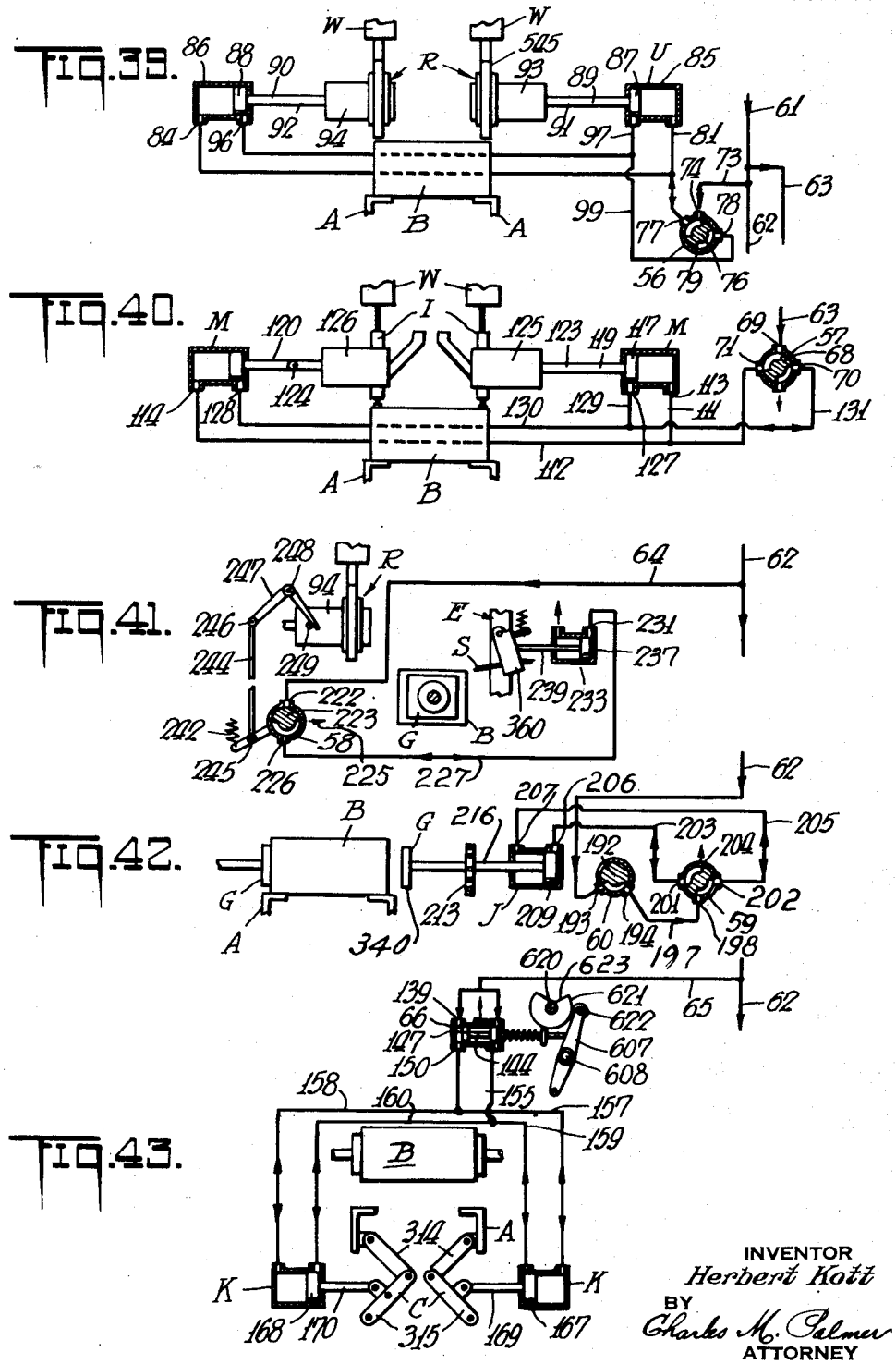

Patented July 14, 1953

2,644,944

UNITED STATES PATENT OFFICE 2,644,944

MEANS FOR STRAPPING BOXES

Herbert Kott, Flushing, N. Y., assignor to Automatic Nailing Machinery Co., Inc., New York, N. Y., a corporation of New York Application July 9, 1948, Serial No. 37,840

20 Claims. (Cl. 1—10)

1

The present invention relates to a machine for strapping boxes and it particularly relates to the metal strapping of the ends of wooden boxes designed to receive and carry bottles.

It is among the objects of the present invention to provide a novel mechanism for strapping boxes, and particularly wooden boxes, which may be readily controlled by a single operator and which will wind the strapping on the box so that it will be convex toward the box and hug the box most closely.

Another object is to provide a novel machine for strapping boxes, in which the operations of feeding the metal straps, nailing the ends of the same, rotating the box to wind the straps thereon, stopping the rotation when the strapping is completed, and nailing and cutting the completed strapping is all accomplished automatically or semi-automatically without need for the operator to handle the box, the strapping, the nails or the strap cutters.

A further object is to provide an automatic box strapping machine which will give a high rate of production of boxes with metal strapped ends and which will only require attention or manual intervention of the operator in placing the unstrapped box in proper position and in removing the completely strapped box after completion of the automatic strapping operation.

A still further object is to provide an automatic box strapping machine which will automatically wind the strapping onto the box in such a manner as to tightly hug the box with its curvature convex against the box, the entire handling, nailing, wrapping, feeding and cutting of the strapping being done automatically without requiring the operator to touch or handle the metal strapping at any time and without requiring the operator to draw the strapping from the supply reels.

Still further objects and advantages will appear in the more detailed description set forth below, it being understood, however, that this more detailed description is given by way of illustration and explanation only and not by way of limitation, since various changes may be made therein by those skilled in the art without departing from the scope and spirit of the present invention.

The invention also consists in certain new and original features of construction and combination of parts hereinafter set forth and claimed and as to its other objects, features and advantages, the mode of operation and manner of its organization, these inter alia, may be better understood by referring to the following description considered in connection with the accompanying drawings forming a part thereof, in which Fig. 1 is a fragmentary top plan view of the machine showing the box in initial position before strapping, with the ends of the metal strap in place and with the anvils in up position;

Fig. 2 is a fragmentary front elevational view from the line 2—2 of Fig. 1;

Fig. 3 is a fragmentary front elevational view, similar to Fig. 2, showing the box clamped between the clamping jaws with the anvils removed;

Fig. 4 is a fragmentary top plan view, taken from the line 4—4 of Fig. 3, showing the straps in position on top of the box, after the first nails have been applied and showing the nailing devices positioned adjacent the sides of the box in inoperative withdrawn position;

Fig. 5 is a fragmentary end elevational view on the line 5—5 of Fig. 4 showing one set of nailing devices after the initial end of the strap has been nailed down, but before the box has been rotated to wrap the metal strap around the ends of the box;

Fig. 6 is a fragmentary end elevational view of the box completely strapped, with the strap feeding mechanism in forward position and with the nailing and cutting mechanism about to operate to drive in the second or final nail and thereafter cut the strap;

Fig. 7 is an end elevational view similar to Fig. 6, showing the strap feeding mechanism in rearward position ready to feed a new length of strap and showing the operation of the nailing and cutting mechanism to nail and cut the completed strap away from the feeding device;

Fig. 7a is a fragmentary vertical sectional view upon the line 7a—7a of Fig. 7;

Fig. 8 is a fragmentary top plan view upon an enlarged scale as compared to Fig. 7, showing the completely strapped box and the strap feed mechanisms, in return position with the initial portion of the strap, which normally is in position ready to be nailed to a new box with the end to be nailed broken away better to show the nail ends of the previous strapping;

Fig. 9 is a fragmentary end elevational view of the mechanism of Fig. 8 showing the end of the next section of strap projecting over the box;

Fig. 10 is a top perspective view showing the completely strapped box after removal from the machine, upon a somewhat smaller scale as compared to Figs. 8 and 9;

Fig. 10a is a side perspective view of the completed strapping if it were removed from the end of the box of Fig. 10;

Fig. 11 is a fragmentary front elevational view of the lower part of the entire mechanism, showing the box in position upon the anvil members as indicated in Figs. 1 and 2 and upon a smaller scale as compared to Figs. 1 and 2, Fig. 11 being taken from the line 11—11 of Fig. 12;

Fig. 11a is a detailed fragmentary side elevational view showing the upper part of the nail feeding device for the nailing mechanism taken upon the line 11a—11a of Fig. 12;

Fig. 12 is an end elevational view of the complete mechanism from the line 12—12 of Fig. 11;

Fig. 12a is a fragmentary top plan view taken from the line 12a—12a of Fig. 12;

Fig. 13 is a transverse horizontal sectional view taken upon the line 13—13 of Fig. 12;

Fig. 14 is a transverse vertical side sectional view taken upon the line 14—14 of Fig. 11 and upon an enlarged scale as compared to Fig. 11;

Fig. 15 is a fragmentary side elevational view of the feeding device of the nailing mechanism;

Fig. 16 is a fragmentary side elevational view upon the line 16—16 of Fig. 15 showing the construction of the nail feeding device of the nailing mechanism;

Fig. 17 is a fragmentary vertical side sectional view of the machine similar to Fig. 14, but showing a later stage in the operation in which the strap is being wrapped around the ends of the box;

Figs. 18, 19 and 20 are diagrammatic fragmentary side sectional views showing successive stages in the strapping operation, namely, the feeding of the end of the strap, wrapping of the metal strapping around the ends of the box, and finishing of the wrapping of the strapping around the box preparatory to nailing and cutting of the completed strapping respectively;

Fig. 21 is a fragmentary front elevational view, similar to Fig. 11, showing the anvil elements withdrawn downwardly by toggles after the box has been clamped in proper position to be rotated and strapped;

Fig. 21a is a vertical sectional view upon the line 21a—21a of Fig. 21;

Fig. 22 is a fragmentary vertical side sectional view, showing the final nail being driven after the strapping has been completed;

Fig. 23 is a transverse vertical sectional view through the end of the box through the final holding nail, showing said second nail completely driven into the box as the cutting mechanism cuts the strap;

Fig. 24 is a fragmentary vertical sectional view, similar to Fig. 18 but upon an enlarged scale, showing the strapped box of Fig. 23 removed and a new box in position ready to be strapped, with the initial end of the strap projecting thereover ready to be nailed down;

Fig. 25 is a transverse sectional view upon the line 25—25 of Fig. 26, showing a lower portion of the nailing mechanism with the hammer about to drive the nail into position;

Fig. 26 is a fragmentary horizontal transverse sectional view upon the line 26—26 of Fig. 25;

Fig. 27 is a transverse sectional view, similar to Fig. 25, but showing the nailing chuck moved over the wall or margin of the box;

Fig. 28 is a top horizontal sectional view of the nailing mechanism, showing said nailing mechanism in operative position;

Fig. 29 is a horizontal sectional view similar to Fig. 28, showing the operation of the shearing die in position to cut off the end of the strap;

Fig. 30 is a side elevational view of the cutting or shearing mechanism upon the line 30—30 of Fig. 29;

Fig. 31 is a side perspective view of the shearing punch or cutter;

Fig. 32 is a side perspective view of the guide for the sliding shearing punch;

Fig. 33 is a side elevational view similar to Fig. 30, showing the cutting die and shoe after it has cut the complete strapping and has been withdrawn;

Fig. 34 is a diagrammatic layout of the entire pneumatic control mechanism, showing the operating valves and pneumatic actuators or motors;

Fig. 34a is a diagrammatic view of the operating mechanism for the nailing and shearing devices and the electrical circuit associated therewith;

Fig. 35 is a fragmentary top plan view of the alternate feed to the nailing mechanism from the line 35—35 of Fig. 16;

Fig. 36 is a top plan view upon an enlarged scale of the feeding device of Fig. 35 from the line 36—36 of Fig. 38 and upon an enlarged scale as compared with Fig. 35;

Fig. 37 is a fragmentary side vertical sectional view upon the line 37—37 of Fig. 36, showing the feeding device; and Fig. 38 is a fragmentary side vertical sectional view upon the line 38—38 of Fig. 36.

Figs. 39 to 43 show the alternative positions of the various parts in diagrammatic form similar to Fig. 34, Fig. 39 showing the alternative position of the cutters, Fig. 40 showing the alternative position of the nailers, Fig. 41 showing the alternative position of the feed devices, Fig. 42 showing the alternative position of the laterally reciprocable gripping jaw, and Fig. 43 showing the alternative position of the anvils.

*Summary of showing of figures*

The sequence of operations is generally shown in Figs. 1 to 9, 17 to 20, 22, 23 and 24.

The general layout of the entire machine with its left frame X and its right frame Y is shown best in Figs. 11, 12, 13, 14, 17 and 21.

The nailing mechanism I is shown best in Figs. 11a, 15, 25, 26 and 27.

The alternate nail feeding mechanism T is shown best in Figs. 35 to 38.

The shearing mechanism for cutting the metal strapping after the box has been completely strapped, is shown best in Figs. 28 to 33.

The jaws or heads F and G and the anvils A and their motors K are best shown in Fig. 21.

The strap feeding mechanism is best shown in Figs. 8, 9, 22, 23 and 34. The general layout of the entire pneumatic mechanism is best shown in Fig. 34.

*Summary of box strapping procedure*

Referring to Figs. 1 to 9, the unstrapped box B is placed in position manually on the anvils A. The anvils A are operated by toggle mechanism G best shown in Figs. 14 and 21.

The box B itself (see Figs. 1 to 10) consists of the bottom 50, the side walls 51 and the end walls 52. The box ends or margins 52 are somewhat thicker and stronger than the bottom 50 and the side walls 51 (see Figs. 1 to 10).

The entire box structure B is to be reinforced by the metal strapping S, which is to be wrapped around the end walls 52 and over the margins or edges of the bottom 50 and the side walls 51, which embrace and hold said end walls 52. The straps S are fed to the box by the strap feed mechanisms E. The straps S usually consist of two continuous strips of thin sheet steel rolled up on supply reels D (see particularly Figs. 12, 13, 14 and 17).

When the box B is placed in position as shown in Figs. 1 and 2 upon the anvils A, the ends 53 of the straps S should already have been moved over or placed on top of the end walls 52 of the box B.

The movable clamping jaw G will then clamp the end walls 52 of the box B. The first nail H is then inserted by the nailing device I which is moved to a position over the box ends 52 and then withdrawn by the mechanism M (see also Fig. 28) after the first nail H (see Fig. 4) has been applied. Then the anvils A are withdrawn by the toggles C, as indicated in solid line position in Fig. 21. The box B is then free to be turned by the gripping jaws F and G.

The box B is then rotated while clamped between the reciprocable jaw G and rotatable jaw F by rotational drive mechanism N (see particularly Figs. 13 and 21). The box is rotated a full 360° by the clutch mechanism O (see particularly Figs. 12 and 14), the operation of which is initiated by the foot treadle P.

When the straps S have been wrapped around the ends of the box B, the second nail Q is driven into position as shown in Figs. 8 and 9, and then the strapping S is cut. The cutting mechanism R of Figs. 28 to 33 is actuated into the position of Figs. 7 and 30 by the motors U to cut the end of the strap S. During the final nailing and cutting, the strap feed mechanisms E have been withdrawn to the position of Figs. 7 and 22. The strap feed mechanisms are operated by the pneumatic motors Ra (see particularly Fig. 8).

The nails H and Q are fed alternatively in proper sequence by the nail feeding mechanism T as best shown in Figs. 35 to 38.

Only one nail H or Q is in position to be driven into the strap S upon each operation of the hammers 506 of the nailing mechanism I (see Figs. 22, 23, 25 and 27). One nail H is driven at the beginning of the attachment of the strap S (Figs. 4 and 18) and the second nail Q at the conclusion of the strapping operation (Figs. 8, 9, 22 and 23).

*Pneumatic system*

Referring particularly to Fig. 34, the various motors J, K, M, Ra and U are shown as being actuated from a central pneumatic source although it is obvious that they may be operated by hydraulic motors, rotary electric motors or solenoid motors or mechanically actuated devices, such as cams or screws.

In Fig. 34 the box B is shown positioned on the anvils A which are held in raised positions by the toggles C by the pneumatic motors K.

The straps S are shown with their ends 53 over the end walls 52 of the box B with the non-reciprocable rotatable jaw F and the reciprocable rotary jaw G clamping the ends 52 of the box B.

The movable jaw G will be held in position by the pneumatic motor J. The rotary drive N will not be actuated until the anvils A have been removed after the first nails H have been driven.

As shown, the feed mechanisms E have been moved to forward position as indicated by the arrows 55 by the motors Ra. The nailing mecha-nisms I are actuated by the motors M and the heads W operate to drive the first nails H, while the anvils A are still in raised position as shown in Fig. 34. After the strapping has been completed, the pneumatic motors Ra will withdraw the strap feed devices E.

Then the nailing mechanisms I and the shearing mechanisms R will be moved to nail and cut the ends of the completed strapping S by the motors M and U.

The nailing device I and the shearing device R will then be operated by the reciprocating heads W respectively to drive the nails Q and in sequence shear the ends of the strap S.

In Fig. 34, this operation is controlled by the manually operated valves 56, 57, 59 and 60 and by the automatically operated valves 58 and 66, which are connected with the central source of air pressure 61.

From the source 61, the air pressure flows through the main line 62 which has branches 63 and 73 to the valves 57 and 56 respectively, a branch 64 to valve 58 and a branch 65 to the automatic piston valve 66. The main line 62 terminates or leads directly to the valve 60.

The valve 57 is actuated by the handle 67 which turns the rotary valve element 68. The valve itself has the main inlet port 69 and three other ports 70, 71 and 72. The outlet port 72 is open to the atmosphere.

The line 73 leads to the inlet port 74 of the valve 56. The valve 56 has a handle 75 which operates the turning valve member 76. The valve body is provided with the ports 77 and 78 and a fourth port 79 which is always normally open to the atmosphere.

The port 77 is connected to the line 80, which has branches 81 and 82 to the ports 83 and 84 of the cylinders 85 and 86 of the motors U for the shearing devices R. The ports 83 and 84 are on one side of the pistons 87 and 88 in the cylinders 85 and 86. The pistons 87 and 88 are provided with connecting rods 89 and 90 having swivel connections 91 and 92 to the slide plates 93 and 94 of the shearing devices R.

To the ports 95 and 96 at the other ends of the cylinders 85 and 86 are connected the lines 97 and 98, which join together to form a main line 99 connected to the port 78 of the valve 56.

The port 71 of the valve 57 connects with the line 110 which branches into the lines 111 and 112. These lines respectively lead to the ports 113 and 114 of the cylinders 115 and 116. The cylinders 115 and 116 receive the pistons 117 and 118 having piston rods 119 and 120 passing through the stuffing boxes 121 and 122. The rods 119 and 120 are connected to the swivels 123 and 124 which, in turn, are connected to the slide members 125 and 126 of the nailing devices I (see also Figs. 28 and 29). The nailing devices will be more fully described in connection with Figs. 11a, 15, 22, 23 and 35 to 38.

The other ports 127 and 128 from the cylinders 115 and 116 connected to the pressure lines 129 and 130, which join in the line 131 which leads to the port 70 of the valve body 57.

In the position shown, the valve 57 will connect ports 69, 70, 128 and 129 on the pressure side and 127, 128, 71 and 68 on the exhaust side. This will permit air pressure to be applied to the left face of piston 117 and the right face of piston 118, moving the nailing mechanisms I away from the margin of the box B. When the lever 67 of valve 57 is thrown in the direction 220 to connect ports 69 and 71 on the pressure side and ports 70 and 72 on the exhaust side, the nailing mechanisms will be moved over to insert either the first nail H or the last nail Q. When the last nail Q is inserted, both levers 75 and 67 will be operated so that the shearing mechanisms R will also be moved over to cut the completed strapping S.

As shown, valve 56 will connect ports 74, 78, 96 and 97 withdrawing the shear mechanisms R. When the handle 75 is moved in direction 221, the ports 74 and 77 on one side and the ports 78 and 79 on the other side will be connected in pairs. If desired, handles 67 and 75 may be provided with return springs (not shown) to return them to the position shown in Fig. 34.

The branch 65 from the main line 62 leads to the ports 139 and 140 of the piston valve 66. The valve 66 has a cylinder 141, a double piston 142 on the piston rod 144. The piston rod 144 has a collar 145 against which reacts the spring 143 biasing the piston to the right. The end 146 of the piston rod 144 will be pressed against and move with the lever 607 pivotally mounted at 608 (see also Figs. 12 and 14). The lever 607 at its upper end carries a roller or follower 622 which rides on the cam 621. The cam 621 has a recess 623. The cam 621 is driven on the shaft 620. The shaft 620 will be rotated 360° each time the treadle P is depressed. This will turn the box B through 360° through the mechanism N and clamping devices F and G.

As the cam 621 rotates and lever 607 oscillates, the ports 150 and 151 (see also Fig. 12) alternatively will be connected to the inlet ports 139 and 140 or to the outlet atmospheric port 153 which leads to the atmosphere. The ports 150 and 151 are connected to the lines 155 and 156. The lines 155 and 156 are respectively connected to the lines 157 and 158 and to the lines 159 and 160 which lead to the ports 161 and 162 and to the ports 163 and 164 in the cylinders 165 and 166.

The cylinders 165 and 166 receive the pistons 167 and 168 which have piston rods 169 and 170 passing through the stuffing boxes 171 and 172 (see also Figs. 11, 12 and 13). The piston rods 169 and 170 are connected by the swivel links 173 and 174 to the toggle mechanisms C which actuate the anvils A (see also Figs. 14 and 21).

In the position shown in Fig. 34, the pistons 167 and 168 will have moved the toggles C so as to elevate the anvils A. In this position, the piston 142 of the valve 66 has taken a position where the ports 140, 151, 163 and 164 will be in communication and the roller 622 on the lever 607 will be in the recess 623. The ports 161, 162, 150 and 153 will also be in communication to the air, exhausting or releasing any pressure on left side of piston 168 and right side of piston 167. When the cam 621 rotates, the piston 142 will be moved to the right from the position shown in Figure 34 to connect ports 139, 150, 161 and 162 on the pressure side and ports 153, 151, 163 and 164 on the atmospheric side, collapsing toggles C and lowering anvils A so that the box B may rotate as shown in Figures 21 and 43.

The valve 60 for controlling the movement of the anvils is directly connected to the main line 62 at the port 193. The valve 60 has a handle member 191 which actuates the rotary valve element 192 to establish connection or cut off connection between the inlet port 193 and the outlet port 194. The handle is normally biased in the direction of the arrow 195 by the spring 196 to cut off such connection.

The line 197 from the port 194 of the valve 60 leads to the inlet port 198 of the valve 59. The valve 59 has a handle 199 which is designed to operate the rotary element 200 to connect the inlet port 198 alternately to the port 201 and line 203 or the port 202 and line 205. The lines 203 and 205 from the ports 201 and 202 respectively lead to the ports 206 and 207 of the cylinder 208 of the pneumatic motor J (see also Figs. 13, 21 and 42).

The cylinder 208 is provided with a piston 209. The piston 209 has a piston rod 210 extending through the stuffing box 211. The piston rod 210 actuates the rod 216. The rod 216 passes through and turns with the hub 212 receiving the sprocket or toothed wheel 213. The wheel 213 is driven by the chain 214. The rod 216 is connected to the reciprocable clamping head 340 carrying the clamping member 330.

In the position shown in Fig. 34, the valves 59 and 60 will connect ports 193, 194, 198, 201 and 206 and the air pressure will move the piston 209 to the left, pressing the clamping member 330 against the box B.

Turning the handle 199 in the direction 250 a distance of 90° (Figure 42) will connect ports 193, 194, 200, 202 and 207, removing the clamping member 330 from the box B after strapping is completed.

The line 62 (Figures 34 and 41) also communicates with the branch line 64 which leads to the port 222 of the valve 58. The turning valve element 223 is operated by the handle 224 either to connect port 226 of valve 58 to the atmospheric port 225 or to the inlet port 222. The port 226 connects with the line 227 which splits into the lines 228 and 229. The lines 228 and 229 lead to the ports 230 and 231 of the cylinders 232 and 233. The cylinders 232 and 233 have the outlet ports 234 and 235 and also receive the pistons 236 and 237. The pistons 236 and 237 have piston rods 238 and 239 which extend through the stuffing boxes 240 and 241. The piston rods 238 and 239 actuate the strap feeding mechanisms E (see also Figs. 6, 7, 8, 9, 22, 23 and 24).

The valve handle or lever 224 (Figures 36 and 41) is biased by the spring 242 against the direction of the arrow 243. The lever 224 is connected to the rod 244 at the pivotal connection 245. The rod 244 in turn is connected by the pivotal connection 246 to the bell crank lever 247. The lever 247 is pivotally mounted at 248 and is actuated by the stud member 249. The stud member 249, on each reciprocation of the cutting devices R at completion of the strapping to clear the box, will move the bell crank lever 247 in the direction 252 to the position shown in Figure 41.

In the operation of the strap feeding devices E, the pistons 236 and 237 of the motors Ra will first move rearwardly upon insertion of the final nails Q. After cutting of the completed strapping S by the cutting devices R, the feeding devices E will be moved forwardly to feed the initial ends 53 of the strapping over the ends 52 of the new box B placed on the anvils A.

When the bell lever 247 is actuated by the stud 249 in direction 252, moving the rod 244 downwardly (Figure 41), the rear ends of the cylinders 232 and 233 through the ports 230, 231, 226 and 225 will be connected to the atmosphere. The devices E will then be moved to the right by return springs 362. As soon as the shearing mechanisms R have again been withdrawn by the cylinders U, the feed devices E will be returned by pneumatic pressure being applied through line 64, ports 222 and 226 of valve 58, line 227 and ports 230 and 231.

This will be accomplished when the new box B is placed in position and the ends 53 of the strapping S will then be in position over the margins 52 of box B ready to receive the first nails H as shown in Figure 24.

*Machine frame structure*

As shown in Figs. 11, 12, 13 and 14, the left and right upright machine frames X and Y are mounted on a base or table 260 which may be mounted upon the floor or upon a foundation by the legs or depressed depending marginal portions 261 (see particularly Fig. 14). The frames X and Y have the cross plates 258 and 258a. Extending upwardly and mounted upon the left cross plate 258 are the U-cross section side frame members 262 of the frame structure X. The bottom cross plate 258 connects the side members 262 which has the outwardly inclined lower portions 263 (see Figs. 11 and 13). The lower portion of the frames 262 fit between the tracks 264 (see Fig. 13). Between said frames 262 is positioned the lug 266 receiving the threaded opening 267. Through the threaded opening 267 extends the screw 268. The end 269 of the screw 268 is carried by the central portion 270 of the yoke 271. The yoke 271 is mounted upon the table 260 (see Fig. 11) by the bolts 272. The screw 268 is actuated by the hand wheel 273 on the shaft 274. The hand wheel 273 drives the worm 276 which meshes with the gear 277 which turns the screw 268. The screw 268 extends through the structure X and is also threaded into the sleeve 280 fitting in the cradle 281 in the lug 278 (see Fig. 11).

By turning the wheel 273, it is possible to move the frame structure X either to the left or right as indicated by the double arrow 279 of Figs. 11 and 13 to accommodate different sizes of boxes.

Extending between the side members 262 are the transverse member 311 (see Figs. 17 and 21), carrying an anvil A, the transverse member 325 carrying the reciprocating, nailing and cutting mechanisms I and R, the transverse structures 337 and 338 (see also Figs. 17 and 21) carrying the rotatable jaw mechanism F and also the top plate 447 (see Fig. 12) carrying the mechanical drive mechanism V. At the bottom of the frame structure X is positioned the U-shaped cross brace 294 having side legs 295 attached to the side members 262 (see Fig. 14).

The fixed frame structure Y consists of the four U-shaped corner vertical beams 290 and 291 which are tied together by the cross bars 292 and 293 (see Fig. 13). The vertical members 290 and 291 are connected by the base plate 258a. The structure 311 carrying the right hand anvil A (see Fig. 13) also extends between and is mounted on the vertical channels 291. There is also provided the angle braces 321 with the side legs 322 (see Fig. 12) and the cross tie member 323 held in position by the bolts 324.

The rotary mechanism N and the reciprocable jaw G and its pneumatic motor J are mounted on the transverse members 292 and 351 (see Fig. 21) forming part of the structure Y. The nailing mechanism I and cutter mechanism R are supported on the U-frame member 325 of the frame structure Y having the side legs 326 on which is mounted the plate 541 (see Fig. 12). The top plate 447 supports the mechanical driving mechanism V.

*Anvil structure*

The anvil structures A (see Figs. 11 to 14, 17 and 21) include the vertically sliding box-support members 300 which are connected by webs 301 to the vertical plate members 302 which are provided with the dovetailed guide members 303 (see particularly Fig. 13). These guide members 303 engage the dovetailed guide projections 304 (see Fig. 13) extending outwardly from the plates 305. The bolts 306 (see Fig. 17) are provided to adjust the position of the plates 302 in respect to the plates 305. The bolts 306 are mounted in the plates 305 and fit into the vertical slots 307 in the central portions 302a of the plate members 302. The vertical slider plates 305 are also provided with the dovetailed guide portions 308 (see Fig. 13) which engage the corresponding projections 309 on the fixed plate 310 which is mounted on the cross beam members 311 (see Fig. 21) of the frame structures X and Y. The plates 305 (see Fig. 17) carry the outwardly projecting lugs 312 which project through the slots 329 in the plates 302. Between the lugs 312 extend the pivot rods 313 carrying the upper ends of the links 314 (see Figs. 14, 17, 21 and 34). The lower ends of the links 314 are pivotally connected to the arms 315 by the pivot rod 316. The links 315 at their lower ends are connected to the pedestals 317 by the rods 318. The links 173 and 174 (see also Fig. 34) are connected to the links 315 at the pivotal connections 319.

The actuation of the toggle C and the anvils A has already been fully described in connection with Fig. 34. Fig. 21 shows the uppermost and lowermost positions of the slidably operated anvils A respectively in dot and dash and solid lines.

*Rotatable clamping members*

The fixed and movable clamping heads F and G are shown in detail in Fig. 21, and are also shown diagrammatically in Figs. 1, 2 and 42. They are also shown in the assemblage in Figs. 11, 12, 13 and 34. The fixed head F has a square or rectangular contact face element 330 (see Fig. 21a) which is roughened or knurled at its periphery 356 and slightly recessed at 357 to contact and clamp the edges or walls of the box B. The contact plate 330 may, if desirable, be of such size and shape so that it will only contact the ends of the bottom 50 and side walls 51 of the box in which case replaceable contact plates 330 would be used for each different width and depth of box B. The plate 330 is carried by the disk 331 (see Fig. 21) which in turn is carried by the disk 332.

Extending to and through the disks 331 and 332 is the hollow shaft 333 which has bearings in the bearing members 334 and 335. The bearing members 334 and 335 are mounted upon the plate 336 having the depending web 358. The plate 336 is supported on the transverse frame members 337 and 338. The frame members 337 and 338 extend between the side structures 262 of the frame X.

The reciprocable head G has a rectangular contact plate 330, the inside face of which is knurled as shown at 356 in Fig. 21a. The plate 330 is mounted on the disk 340. The base of the disk 340 has sliding pins 341 which fit into openings 342 in the rotatable disk member 343. The disk member 343 is carried on the rotatable tube or sleeve 346 which turns in the bearings 345 and 348. The sleeve 348 is fixed and turns with the sprocket wheel 213 by the key 217. The wheel 213 is turned by the chain 214 (see also Fig. 34).

Extending through the bearing element 345, the wheel 213 and the rotatable sleeve 346, is the shaft section 216. The shaft section 216 is permanently attached to the disk 340.

The piston rod 210 is connected to the piston 209 in the cylinder 208 and is connected by thrust bearing 215 to the rotatable shaft section 216. The cylinder 208 and the bearing structure 348 are fixed upon the table 349 which has a downwardly depending web or flange 350. The flange 350 is bolted to the cross member 292. The table 349 is also mounted on the structural member 351 of the frame structure Y.

It will be noted that the rotary jaw structure F is non-reciprocable, while the rotary jaw structure G is reciprocable. The jaw G is held in rotational position in respect to the rotary head 343 by the engagement of the pins 341 in the openings 342.

The reciprocable jaw or head G will normally be held in retracted position by the coil springs 352 which extend between the ears 353 and 354 respectively on the plate members 330 and 343 (see Figs. 1, 2 and 3).

*Strap feeding mechanism*

The strap feeding mechanism E is best shown in Figs. 22 and 24, although it is also shown in smaller scale in Figs. 6, 7, 7a, 8, 9, 12, 14 and 34.

The strap feeding mechanism E consists of two side plates 360 (see Fig. 8). The plates 360 are pivotally mounted by the rod 361 (see Figs. 6 and 14) upon the frame structures X and Y.

The plates 360 are biased by the springs 362 in direction of the arrow 363 (see Fig. 14). The spring 362 extends between the stud 364 attached to the structure E and the stud 365 attached to the frame structure X or Y. The upper portion 366 of the structure E is provided with an adjustable stop bolt 367 (see Fig. 7). The bolt 367 (see Fig. 7) is provided with the lock nut 368. The head of the bolt 367 will be stopped against the lugs 369 on the frame structures X and Y and limit movement in the direction 363. Between the plates 360 (see Figs. 8, 22 and 24) extend shafts or studs 370, 371, 372 and 373 which carry the rollers 374, 375, 376 and 377 to give a reversed bend to the straps S.

The dog 378 is pivotally mounted at 379 on the plates 360. The dog 378 has a jaw 380 to operate against the fixed jaw 381 and grip and prevent retrograde movement of the strap S. The dog 378 is biased by the spring 382. The ends of the spring 382 are attached to the dog 378 and to the fixed stud 383.

The upper rollers 374 fit into grooves 374a on the lower rollers 375 (see Fig. 7a). The other pair of rollers 376 and 377 are of the same construction. The rollers 374 to 377 are freely rotatable. When the strap S passes between the rollers 374 and 375 and rollers 376 and 377, it is given a reverse bend or downward bulge to cling and closely to fit against the edges or margins of the box B by reason of its own resiliency. The strap S along each side of the box B will be bowed toward or curved toward the box B and closely hug the box B as indicated by the completed S in Fig. 10 which has been removed from a strapped box B. When the motors Ra retract the strap feed structures E by the shafts 238 and 239 (Figures 34 and 41) connected to the blocks 390 and 391, the devices E will pass over the straps S without movement of the straps S. The upper ends or jaws 380 of the dogs 378 will move in the direction 392 (see Figs. 9 and 24). On reverse movement, however, the jaws 380 of the dogs 378 will grip the straps S and move the straps S forwardly so that their ends 53 will assume positions as indicated at 53 in Figs. 1, 2, 9 and 24.

When the straps S are withdrawn through the feed devices E upon rotation of the box B, the dogs 378 will permit movement of the straps S in the direction 392.

*Strapping supply*

The supply of strapping material D is shown in Figs. 12, 13, 14 and 17.

As indicated, the supply D consists of the large reels 400 having side walls 401 which are mounted on the stud axle 402 attached to the wall by the flanges 403. The stud axles 402 fit into the bearing cups 404 on the pillows 405 on the upright frames or standards 406 having the base flange 407 attached by the bolts 408 to the table 260. The two reels are connected by the connecting shaft 409 (see Fig. 13).

It will be noted from Figs. 12 and 17 that the strapping S will come off the reels 400 with the upwardly convex curvature. After it passes the devices E it will have a downwardly convex structure as shown in Fig. 10a. This downwardly convex curvature will cause the strapping S to hug the box B most closely.

*Nail feeding mechanism*

The nail feeding device I is best shown in Figs. 11a, 15, 16 and 35 to 38. The feed head T has a shaker pan 420 (see Figs. 11a and 15) to which is attached the flange 421 of the downwardly extending double pivot mount lugs or ears 422 (see Figs. 11a and 12). Between the ears 422 is received the ear 424 of the universal connection member 425. The pivot rod 426 assures swivel movement between element 425 and the ears 422. The element 425 has depending ears 427 between which is received the eye 428 of the rod 430. The pivot pin 429 extends through the eyes 427.

The lower end of the rod 430 (see Figs. 11a and 12) has an eye 431 received between the ears 432 of the yoke or eye 434. The pivot pin 433 extends through the eye 431 and the ears 432 forming a pivotal connection. The yoke or eye 434 is bolted at 435 to the end 436 of the crank 437. The crank 437 has an eye 649 (see Figs. 11a and 12) fitted on the shaft 654. The shaft 654 passes through the disk 653 (see Fig. 11). The shaft 654 is driven from the motor 650 (see Fig. 11) through the reduction gear box 652 to give an oscillating movement indicated by the arrow 438 of Fig. 11a to the pan 420.

The tray 420 is provided with an oscillating connection 439 to the slotted guide member 440 (see Fig. 11a). The slotted guide member 440 is supported by the link 441. The link 441 is connected by the slotted opening 419 and pivot 442 to the slotted member 440. The lower ends of the links 441 are connected to the ears 444 by the pivot pins 443. The ears 444 are mounted on the plates 445 supported by the vertical members 446 (see Fig. 12) from the top plates 447 of the frames X and Y. The slotted member 440 (see Fig. 36) has the side walls 448 and the bottom 449 having two nail guiding slots 450 and 451. The bottom 449 which guides the heads 452 of the nails 453, which are lined up and guided by the bottom section or guide bar 455. The slot 456 will enable insertion of tools to the line up nails 453. The nails 453 will slide down in the direction 457 until they hit the disks 458 and 459.

These disks 458 and 459 are rotated upon the stud shafts 460 extending through the bearing members 461 in the structure 462 forming the front wall of the slotted member 440.

The collars 464 of the bevel gears 463 are fixed on the pins 465 on the upper ends of the shafts 460. The bevelled gears 463 are driven by the intermeshing bevelled gears 466 which are fixed on the shaft 467 which has bearings at 468 in the extensions 469 of the side walls 448 (see Fig. 35).

The disks 458 and 459 are provided with recesses 470 and 471 large enough to receive the heads 452 of the nails 453. The recesses 470 and 471 are positioned 180° apart as indicated best in Fig. 36. When the recesses 470 or 471 come opposite the slots 450 and 451, the heads 452 of the nails 453 will slip into the recesses 470 and 471 with the shanks falling into the open space 472 extending around the parts 473 forming part of the structure 474 (see Figs. 37 and 38). The nails 453 will then be carried around by the rotating members 458 or 459 with the next nail being stopped by the unrecessed edge 475 of said disk members 458 and 459. When the nails 453 have been carried around 180°, they will fall into the recesses 476 in the structure 477 forward of the structure 474.

The structure 474 forming part of the slotted member 440, is provided with the flange member 478 (see Figs. 11a, 37 and 38). The flange members 478 rest upon the flange members 480. The flange members 480 form part of the bracket 481 connected by the flanges 482 upon the structure 483 (see Fig. 11a) connected to the frames X and Y. The nails 453 drop as indicated by the dot and dash lines 490 in Fig. 37 into the funnel 491 through which the nails 453 will pass indicated in the direction by arrow 492.

The shaft 467 (see Fig. 16) is driven by the sprocket wheel 494 fixed to said shaft by the collar 495 and the pin 496. The chain drive 497 is operated from the sprocket 641 driven by the gear 639 on the shaft 640 (see Fig. 15). The gear 638 on the main crank shaft 674 drives the gear 639. The shaft 674 is driven by the mechanism V shown in Figs. 12 and 12a, as will be more fully described subsequently.

The shaft 467 will only be rotated each time the nailing mechanisms I have been moved inwardly by the motors M of Fig. 34 over the end walls 52 of the box B. As the nailing mechanisms I have been moved inwardly, the first nail H or the last nail Q to be driven will already have been dropped into the recess 476 and one of the recesses 470 or 471 will be opposite the slots 450 or 451 and have received the next nail 453.

Then when the nailing mechanisms I have moved into position over the margin of the box B by motors M, the shaft 467 will be operated to turn the disks 458 and 459 by one-half revolution or 180°, so that one nail H or Q will be fed into the recess 476 and the funnel 491 of Figs. 37 and 38 for the next operation, and another will be picked up by the recesses 470 and 471 which come opposite the respective slots 450 and 451.

The reciprocating pan 420 will be continuously operated by the motor 650 through the reduction gear box 652 and the crank 437 to feed nails 453 into the slotted member 440.

*Nail applying mechanism*

The funnels 491 are supported in the eyes 498 by the shoulders 499 (see Figs. 37 and 38). The eyes 498 are positioned at the ends of the brackets 500 attached to the frames X and Y. Below the funnels 491 (see Figs. 25 to 27) are positioned the tubular conduits 501. The conduits 501 have flexible connections 516 to the lower funnels or chutes 502. The chutes 502 have inwardly inclined portions 503 and upwardly extending sleeves 504 which receive the bearing 514 for the hammer rods 506. The hammer rods 506 have the enlarged heads 507 which fit into the slots 508 above the inturned members 509. The slots 508 are in the base structure 510 at the bottom of the reciprocating heads W. The base structures 510 have the dovetailed portions 511 (see Figs. 25 and 27) which fit into recesses 512 in the members 513. The bolts 514a (see Fig. 27) hold the members 510 and 513 together in adjusted position.

At the lower portion of the inclined tubes 503 are positioned separable jaws 520 and 521 (see Figs. 25 and 27) which are pivotally mounted on the ears 522 and 523 on the extensions 524. The leaf spring members 525 will normally press the jaws 520 and 521 together tightly to grasp the nails 453 which will fit in the funnel 526 between the jaws 520 and 521.

Normally both hammers 506 will operate together to drive the single nail H or Q held on each side of the box B between the jaws 520 and 521.

The rotary heads or disks 458 and 459 of Fig. 36 will alternately feed nails into the funnels 491 at such intervals that only one nail 453 will be in position to be driven in position H in Fig. 4 at the beginning of the strapping operation and at position Q in Fig. 8 at the end of the strapping operation.

Although the funnels 491 and the tubes 501 will stay in fixed position as indicated in Figs. 25 and 27, the inclined funnel members 503 will be moved inwardly by the motors M of Figs. 25, 28 and 34, as indicated by the arrows 530 in Fig. 27 to bring the nails 453 directly over the end walls 52 and the strapping S.

As indicated in Figs. 25 to 29, the jaw members 520 and 521 are held between the sections 532 and 533 of the structure 531. The structure 531 has a rearwardly extending element 534 forming part of the sliding plate 126 (see Figs. 28 and 29) having the guiding bevelled or dovetail structure 535. The bevelled structure 535 is received in a dovetailed recess 536 in the upright structure 537 forming part of the bracket 538 having the vertical web 539 and the base plate 540.

The slide 126 is actuated by means of the link 124, the operation of which has already been described in connection with Fig. 34.

The bottom or support flange 540 of bracket 538 (see Figs. 26, 28 and 29) is mounted on the plate 541. The plate 541 (see Figs. 25 to 27) rests on the structural cross member 325 of the side frames X and Y (see also Fig. 12).

As shown in Figs. 25, 26 and 27, the cross member 325 has a central portion 567 recessed at 566 to receive the depending portion 565 of the plate 541. The plate 541 may be moved or adjusted in respect to the central portion 567 of the cross member 325 and fixed in adjusted position by the bolt 568 fitted into the elongated slot 569 (see Fig. 26).

The plate 541 will carry the nailing mechanisms I with motors M as well as the shearing mechanisms R with motor U.

Shearing mechanism

Referring to the shearing mechanisms R and then motors U, in Fig. 31 is shown the cut-off or shearing die itself having the slider shank 545, the lower punch end 546 and the enlarged head 547.

The bevelled side portions 548 fit into the dovetailed recesses 549 (see Fig. 32) between the extensions 550 of the slide or guide member 551. The member 551 is mounted upon the slider bar 94 having bevelled edges 553. Extending downwardly from the bar 94 is the leg 554 carrying the foot 555 having the die slot 556 for receiving the punch 546.

The leg 540 also carries the shoe 557 having the upper and lower flat surfaces 558 and 559 and a forwardly, downwardly inclined face 560 for holding up the strapping S as the punch 546 descends and shears said strapping at the box corner 49 of Fig. 7.

The slide plate 94 is received in the recesses 561 (see Fig. 30) in the plate 562 which has a web 563 connecting it to the base 564. The base 564 is mounted on the adjustable plate 541. The slider member 94 is operated by the link 92 and the piston rod 90 in the manner already described in connection with Figures 34 and 39.

In operation as the last nail Q is driven, the cam or inclined face 560 of the shoe 567 will be moved into cutting position by the motor U of Figs. 31, 34 and 39, as shown in Figs. 29 and 30 lifting the strapping S and enabling the punch 546 to cut said strapping S without striking the already strapped edge of the box B.

Operating mechanism for the nailing and shearing mechanisms

In Fig. 34a is diagrammatically shown a manually operated momentary contact normally actuated switch 700 placed on the front of the machine frame X or Y having the push button 701 and the contact element 702. The contact element 702 is normally pulled against the stop elements 703 by the tension spring 704. When pressed down against contacts 705, it will close a circuit from the conductor 706 and the source 707 through the conductor 708, the solenoid 709, and the conductor 710 back to the source 707.

The solenoid 709 will be energized by manual closure of the momentary contact switch button 701. As a result the nailing mechanisms I and the shearing mechanisms R are actuated by the heads W of Fig. 34. When the solenoid 709 is energized, the solenoid plunger 711 will pull out the clutch lever or pin stop 680 permitting operation of the clutch 679.

The operation of the switch button 701 resulting in operation of the solenoid 709 will actuate the clutch 679 to permit a cycle of operations. However, the nailing mechanisms I and the shearing mechanisms R are operated by the reciprocatory heads W which are driven from the motors 635. The switch button 701 does not actuate the head W nor is it actuated by the head W in the construction shown, although such an automatic connection might be provided.

The clutch 679 shown diagrammatically in Fig. 34a forms part of the operating mechanism more fully shown at the top of Fig. 12 and in Fig. 12a.

In Figs. 12 and 12a, the electric motor 635 is supported on the base 636 from the bracket 637 on the frame structures X and Y. The motor shaft 634 drives the flywheel 658 through the flexible coupling 672. The coupling 672 drives the input reducer shaft 676 extending into the extension 659 of the speed reducer mechanism gear box 657 which has a 5 to 1 reduction.

The output reduction shaft 655 from the extension 656 of the housing 657 (see Figs. 12 and 12a) drives the crank pinion gear 654. The gear 654 meshes with and drives the main gear 678 keyed to the one revoution clutch 679. The clutch 679 has a trip or release lever 680 of Fig. 12 released by the solenoid 709 of Fig. 34a.

When released, the clutch element 679 being keyed to the crank shaft 674 will drive said shaft 674 and the crank 660. The crank shaft 674 drives the gears 638 and 639 and the sprocket 641 (see Fig. 15). The clutch 679 is of conventional construction and release lever or trip 680 are of conventional construction and need not be more fully described.

The crank 660 (see Fig. 12) carries a pin 661 fitting into the eye 662 of the rod 663. The rod 663 (see also Fig. 11) extends downwardly to the eye 665 carrying the rod 664. The rod 664 extends through the slots 666 (see Fig. 11) and reciprocates the head W (shown in Figs. 14, 17, 27, 30 and 33) to actuate the nailing and shearing mechanisms I and R first to drive the initial nail H and then to drive the final nail Q and cut the S strapping at the end of the strapping operation. The lower edge of the reciprocating head W is indicated at 651 in Fig. 12 and it will be noted that it extends across the frame between the lower ends of the opposite crank rods 663. In the showing in Fig. 12, which is from the outside of the frame as indicated in Fig. 11, the motor 650 will be in front of the lower portion of the reciprocating head W.

Whenever the release lever 680 is tripped by the solenoid 709, there will be one complete revolution of the clutch element 679 before it is stopped by re-engagement with the release lever or trip 680. This will result in one complete revolution of the shaft 674 and through the crank 660 and the rod 663 the head W will be reciprocated downwardly and upwardly one time. The disks 458 and 459 of Fig. 36 at the same time will be rotated 180° through the 4 to 1 reduction of sprocket wheels 641 and 494 of Fig. 15. This will result in a new nail H or Q being alternately fed at the end of each cycle of operation of the reciprocating head W as it moves upwardly. The new nail H or Q will be retained in the nail chucks 520, 521 of Figs. 25 and 27 for the next operation of the head W.

Operating mechanism for rotating the box and for the anvils

As shown best on Figs. 12 and 14, the treadle P has a front end 590 at the forward end of the bar 591 which has a foot contact element 592, the top face of which may be corrugated or knurled. The treadle P extends forwardly between the frames X and Y and is pivotally mounted by the eye 593 upon a stud 594 which is carried by the bracket 595. When the treadle P is pressed down as indicated by the arrow 596 against the spring 597, it will lower the bar 598 and release the dog member 599. The spring 597 which biases the pedal member P upwardly is connected between the opening 600 in the bar 591 and the eye 601 on the frame X. When the dog 599 is released, the toothed or clutch wheel 602 on the bearing rod 603 carried by the bracket 604a will be turned by motor 614 through shaft 615, pinion 616 and gear 604. Pinion 616 meshes with drive gear 604 with a 5 to 1 reduction. This will drive the shaft 603 carried by bracket 617. The shaft 603 drives the sprocket wheel 605 and the chain 606. The chain 606 drives sprocket wheel 624 on shaft 620.

The vertical bar 607 is pivotally mounted at 608 on the bracket 609. The bracket 609 is mounted at 610 upon the frame X. The bar or link 611 connects the vertical bar or lever member 598 to the vertical bar or lever member 607 to which members the link 611 is respectively connected by the pivot pins 612 and 613.

The shaft 620 (Figs. 14, 34 and 43) carries a cam 621 which cooperates with a follower member 622 at the upper end of the lever or bar 607. The follower member 622 will normally remain in the recess 623 in the cam 621 when the clutch 602 is thrown out.

Upon movement of the follower roller 622 from the recess 623 as the cam 621 is moved and upon the unrecessed part of the cam 621, the valve 66 will be thrown over to connect pneumatic pressure to the left side of piston 168 and the right side of piston 167 (see Figures 34 and 43), causing motors K to collapse toggles C and lower anvils A. When the roller 622 is removed from the recess 623 it rides the cam 621 (Figs. 12 and 14), and through link 611 it holds the dog 599 carried by the bar 598 from contacting the teeth on the clutch wheel 602 to permit the shaft 620 to make a full revolution. The lower end of the bar 607 by virtue of the cam 621 acting on roller 622 will permit the spring 143 to maintain the valve 66 so as to apply pressure to the cylinders K to cause the toggles C to be broken. Then shaft 620 will continue to turn 360° until the follower 622 again lodges in the recess 623. At the same time the dog 599 will relatch with the clutch 602 and prevent further rotation of shaft 620. The shaft 620 will be driven at one quarter of the speed of the shaft 603 by reason of the diameter ratio of the sprocket wheels 624 and 605. The shaft 620 is mounted by the brackets 625 upon the shelves 626. The shelves 626 are mounted at 627 upon the frames X and Y.

As shown best in Figs. 12 and 21, the shaft 620 also carries the sprocket wheel 628 which drives the chain 214, the sprocket wheel 213 and the gripping members F and G, which hold the box B.

*Summary and sequence of operation*

To summarize the sequence of operations with a single operator standing at the front of the machine and at no time handling the strapping S, after placing the box B upon the anvils A under the projecting ends 53 of the strapping S:

(a) The box B is clamped between the jaws F and G by moving handles 191 and 199 of valves 60 and 59 to establish communication between ports 198 and 202 and ports 193 and 194 (see Fig. 34). The levers are in the right position as shown in Fig. 42 and in this position air pressure will be applied through the ports 193 and 194 of the valve 192 and through the ports 198 and 201 of the valve 59 to the right side of the motor J to press the jaw G against the end of the box B;

(b) The nailing chucks I are moved inwardly by moving handle 67 of valve 57 to establish connection between ports 69 and 71 of valve 57. The handle 67 upon being moved to the right will connect the air under pressure from port 69 to port 71 and to the outside face of the pistons 117 and 118, moving the nailing chucks I toward each other so that they will be in position above the side walls or ends of the box B;

(c) The first nails H are driven after actuation of switch 700 of Fig. 34a. The switch 700 when actuated will energize the solenoid 709 in Fig. 34a, releasing the clutch 679, permitting the cranks 600 to make one complete revolution, driving a nail into the box through the strapping;

(d) The nailing chucks I are withdrawn by moving handle 67 to position shown in Fig. 34. In this position the air under pressure will pass from the port 69 to the port 70 and into the ports 127 and 128 of the motors M, withdrawing the nailing chucks I;

(e) The toggles C are collapsed withdrawing anvils A by a partial downward movement on treadle P by the operator. This is accomplished by the lever 192 being moved to the right in Fig. 34 by the cam 621, which will cause the valve 141 to shift to the right, establishing flow of air under pressure through the port 139 to the port 150 and to the ports 161 and 162 of the motors K. When the toggles C are collapsed, the anvils A will be lowered;

(f) The box B is rotated 360° winding its ends in the strapping S upon complete downward movement of treadle P. The jaw clamp head G will be rotated by the sprocket 213 and the sprocket chain 214. As shown at the lower right-hand corner of Figs. 12 and 14, the movement of the treadle 591 lowers the bar 598 and releases the dog 599. The clutch wheel 602 will be turned by the motor 614 through the shaft 615 of the pinion 616. This will drive the chain 606 and the sprocket wheel 624. From the sprocket wheel 624 the drive will extend to the shaft 216 of the gripping jaw G. The rotation will be stopped at the end of 360° when the dog 599 will re-latch with the clutch 602;

(g) The toggles C are straightened and anvils A placed below completely strapped box by automatic operation of valve 66 to position of Fig. 34 when follower 622 returns to recess 623. After the shaft 216 has turned 360°, the valve 66 will be moved to apply air pressure through the ports 163 and 164 of the motors K to extend the toggles C and elevate the anvils A;

(h) The nailing chucks I and shearing devices R are both moved inwardly by moving both levers 67 and 75 of valves 57 and 56 to right. The air pressure will flow from port 69 to port 68 of the valve 57 and to the ports 113 and 114 of the motors M, moving the nailing chucks I inwardly. At the same time the air pressure will flow from port 74 to port 75 of the valve 56 to ports 83 and 84 of the motors U, moving in the shearing devices R inwardly;

(i) Strapping feeding devices E will be withdrawn automatically by operation of valve 58 by movement of shearing devices R. The movement of the shearing devices R through the lever 247 and the rod 244 causes a movement of the valve 58. As a result the roller feeding devices E will be moved away from the box B and upon their return will force an additional length of the strapping material S over the end of the box, ready to be initially nailed. By reference to Figs. 6, 7, and 9, it will be noted that the feeding devices E release the strapping S on movement to the right but advance it on leftward movement. The devices E will permit movement of the strapping to the left, to be wound around the box, but will prevent reverse movement. The springs 362 will normally bias the feeding devices in the direction 363;

(j) The second nail Q and the strapping S is sheared by closing contact switch 700;

(k) The nailing and shearing mechanisms I and R will be withdrawn by throwing levers 67 and 75 back to position of Fig. 34;

(l) The strap feed devices E will be automatically moved forwardly by operation of valve 58 as the shearing devices R are moved outwardly;

(m) The strapped box B is released by throwing lever 199 of valve 59 to the left, while lever 191 of valve 60 is thrown to the right against spring 196;

(n) Strapped box B is removed and new box B placed on anvils A.

In Fig. 34 is shown the various parts diagrammatically in their position at the commencement of operation, with the cutters R and nailers I wtihdrawn, with the strapping feed devices E in forward position, holding the initial ends of the strapping over the boxes B, with the rotatable clamping jaw G applied to the box B, with the anvils A in proper position, and with the toggles C in extended position.

In Figs. 39 to 43 the cutters R are shown moved inwardly and over the box B and in down position, the nailers I are shown moved inwardly and in driving position, as if the nail had just been driven into the box, the feed devices E are shown in withdrawn position to feed the new ends of strapping over the box, the rotatable jaw G is shown as being withdrawn and the anvils are shown as being lowered and the toggles are shown collapsed, respectively.

Since certain changes may be made in the above methods and machines for strapping boxes and different embodiments of the invention could be made without departing from the scope thereof, it is intended that all matter contained in the above description or shown in the accompanying drawings shall be interpreted as illustrative and not in a limiting sense.

What is claimed is:

1. A box strapping machine, comprising box holding means to support the bottom of the box when the box is being nailed, means for supporting strapping material, feed means for feeding ends of the strapping material to extend over the ends of the box when the box is so supported in position for nailing, clamping means to removably grasp and turn the box, nailing means to nail the end of the strapping to the ends of the box, means to move said holding means away from the box, and means to rotate said box and cause said strapping to wind around said box.

2. A box strapping machine, comprising box holding means to support the bottom of the box when the box is being nailed, means for supporting strapping material, a strap feeder to feed the end of strapping over the box when the box is supported in position for nailing, nailing mechanisms to nail the ends of the strapping to the box, opposite grasping jaws to removably grasp the box, means to remove said holding means away from the box and permit rotation of the box by the jaws, and a driver to rotate said jaws and said box with said jaws and thereby to cause said strapping to wind around said box.

3. A box strapping machine, comprising box holding anvils to support the bottom of the box when the box is being nailed, means for supporting strapping material, a strap feeded to feed the ends of the strapping over the ends of the box when the box is so supported in position for nailing, nailing mechanisms to nail the ends of the strapping to the ends of the box, opposite grasping jaws to removably grasp the box, and means to rotate said jaws and said box with said jaws and thereby to cause said strapping to wind around said box.

4. A box strapping machine, comprising a table to hold the box during nailing, laterally reciprocable nailing mechanisms, laterally reciprocable shearing mechanisms, means to operate said first mechanisms to nail the strapping to the ends of the box, means to operate said second mechanisms to nail and cut the completed strapping and reciprocable grasping jaws to removably grasp the ends of the box, means to rotate the jaws, and means to lower said table during the rotation of said jaws, the rotation of said jaws causing said strapping to be wound upon the ends of said box.

5. A box strapping machine, comprising reels for supporting strap material, box supporting means, a strap feeder to feed the ends of the strap over the ends of the box, nailing mechanisms to nail the ends of the strap to the box, opposite grasping jaws to removably grasp the box, means including a toggle to move said supporting means away from the box and permit rotation of the box by the jaws, a driver to rotate said jaws and said box with said jaws and cause said strapping to wind around said box, a drive mechanism to cause rotation of said driver 360°, and nailing and cutting mechanisms to nail and cut the completely wound strapping.

6. A box strapping machine comprising spaced reels for supporting a supply of metal strapping material, box positioning anvils, a strap feeder to feed the ends of the strapping over the ends of the box, pneumatic means to move said strap feeder toward the box at the beginning of a strapping operation and away upon the completion of the strapping operation, nailing mechanism to nail the ends of the strapping to the ends of the box, pneumatic means to move said mechanism away from the box at the beginning of the strapping operation, opposite grasping jaws to removably grasp the ends of the box, means including a toggle to move said anvils away from the box and permit rotation of the box by the jaws, pneumatic means to operate said last mentioned toggle means, a driver to rotate said jaws and said box with said jaws and cause said strapping to wind around said box, a clutch mechanism to cause rotation of said driver, a treadle to throw in said clutch mechanism, a throw-out mechanism to throw out said clutch mechanism after the box has been rotated 360°, and a cutting mechanism to cut the strapping material after the box has been wound.

7. A box strapping machine to strap the sides of a rectangular wooden frame box and to receive metal strapping from reels of metal strapping comprising vertically reciprocable anvils to support the box when being nailed and to release the box when strapping is being wound upon the box, rotatable jaws to clamp the ends of the box and to rotate the box and wind the strapping thereonto, roller feeds to feed the initial ends of the strapping material to the box, nailers to nail the initial ends of the strapping material to the box and to nail the wrapped-around strapping material to the box, and cutters to cut off the strapping material from the reels after strapping has been completed and nailed.

8. The machine of claim 7 in which the anvils, rotatable jaws, roller feeds, nailers and cutters are provided with pneumatic actuating motors.

9. The machine of claim 7 in which the jaws are provided with a releasable clutch and foot treadle to permit said jaws to be rotated 360° when grasping said box.

10. The machine of claim 7 in which a foot treadle is provided with means to lower said anvils upon initiation of rotation of said jaws.

11. The machine of claim 7 in which the roller feeds are provided with means to cause initial feed of the ends of the strapping actuated by the operation of said cutters.

12. The machine of claim 7 in which an actuating button is provided to cause vertical nailing action at the beginning and end of said strapping operation.

13. In a box strapping machine for a rectangular wooden frame box to receive metal strapping material from a reel and to wind and nail said strapping material upon the ends of the box and to cut off the wound and nailed strapping material, rotatable jaws to grip the ends of the box and turn it to wind the strapping material on said ends, nailers to nail the initial ends of the strapping material as well as the completed strapping onto said box, cutters to cut the completed strapping material from the reel, and reciprocable anvils to hold the box while the strapping material is nailed thereto.

14. A box strapping machine to wind metal strapping material upon a box from a reel of metal strapping material and to nail the strapping material upon the box and cut off the completed strapping material from the reel comprising means to support the box while the strapping material is being nailed thereto, means to rotate the box to wind the strapping material thereon, means to remove the supporting means upon rotation of the box, and means to limit the rotation of the box to 360°.

15. A box strapping machine to wind metal strapping material upon a box from a reel of metal strapping material and to nail the strapping material upon the box and cut off the completed strapping material from the reel comprising means to support the box while the strapping material is being nailed thereto, means to rotate the box to wind the strapping material thereon, and a manually controlled actuator to cause successive removal of the supporting means and rotation of the box after said removal and to limit the rotation to 360°.

16. A box strapping machine to wind metal strapping material upon a box from a reel of metal strapping material and to nail the strapping material upon the box and cut off the completed strapping material from the reel comprising means to support the box while the strapping material is being nailed thereto, means to rotate the box to wind the strapping material thereon, means to remove the supporting means upon rotation of the box and means to limit the rotation of the box to 360°, nailing mechanisms, and cutter mechanisms, and separate means to move said mechanisms over the box before and after rotation and to actuate them to nail and cut the strapping material before and after rotation.

17. In a box strapping mechanism, a retractable anvil to support the bottom of the box when placed in position in the machine for strapping, rotatable retractable side gripping jaws to grasp the sides of the box and rotate the same through 360° and wind metal strapping material thereon, means for supporting a reel of metal strapping material, a feeder to feed the strapping material to an end of the box, a vertically reciprocable nailer to nail the end of the strapping material to the box, vertically reciprocable cutters to cut the strapping material after winding upon and nailing to the box, and successively actuated separate means to apply said jaws to the box, to withdraw the anvil, to apply the nailers to nail the metal end of the strapping material, to rotate the jaws 360° to wind the strapping material on the box, to nail the wound strapping material, to cut the wound and nailed strapping material, to replace the anvil under the box, and to withdraw the jaws from the sides of the box.

18. The mechanism of claim 17 in which the means to apply and withdraw the jaws and the means to apply and withdraw the anvil are actuated by pneumatic motors while the means to apply the nailers and cutters and to rotate the jaws are actuated by electric motors.

19. The mechanism of claim 17 in which the nailers are provided with two nail application positions and in which means are provided alternately to feed a nail to one position and then to the other position so that the beginning of the strapping material and the end of the strapping material will be nailed to the box in different positions.

20. The mechanism of claim 17 in which the feeder is horizontally reciprocated by pneumatic means first to withdraw the cut end of the strapping material from the box which has been strapped and then to apply a new end of the previously cut strapping material over a new box to be nailed in position.

HERBERT KOTT.

References Cited in the file of this patent

UNITED STATES PATENTS

| Number | Name | Date |
| --- | --- | --- |
| 170,953 | Hynson | Dec. 14, 1875 |
| 392,106 | Clark | Oct. 30, 1888 |
| 515,393 | Atwood | Feb. 27, 1894 |
| 933,890 | Cummings | Sept. 14, 1909 |
| 1,026,567 | Delihanty | May 14, 1912 |
| 1,230,989 | Bluege | June 26, 1917 |
| 1,265,560 | Watson | May 7, 1918 |
| 1,297,392 | Nelson | Mar. 18, 1919 |
| 1,436,293 | Ripley | Nov. 21, 1922 |
| 1,650,843 | McChesney | Nov. 29, 1927 |
| 2,088,570 | Blanchard | Aug. 3, 1937 |